United States Patent [19]

Woyton

[11] Patent Number: 4,770,065

[45] Date of Patent: Sep. 13, 1988

[54] VARIABLE SPEED DRIVE

[75] Inventor: Joseph Woyton, Jacksonville, Fla.

[73] Assignee: Reliance Electric Company, Greenville,, S.C.

[21] Appl. No.: 936,999

[22] Filed: Dec. 2, 1986

Related U.S. Application Data

[63] Continuation-in-part of Ser. No. 757,466, Jul. 22, 1985, abandoned.

[51] Int. Cl.$^4$ .......................... F16H 11/06; G05B 5/01
[52] U.S. Cl. .......................................... 74/866; 474/12; 474/18; 318/624
[58] Field of Search .................. 474/8, 11, 19, 29, 30, 474/31, 37, 12, 17, 18, 28, 70; 74/866; 318/624, 678, 681, 490, 434; 364/424.1; 371/62

[56] References Cited

U.S. PATENT DOCUMENTS

| | | | |
|---|---|---|---|
| 2,076,202 | 4/1937 | Lewellen et al. | 474/11 X |
| 3,483,455 | 12/1969 | Klysa et al. | 318/490 X |
| 3,510,738 | 5/1970 | Iversen | 318/624 X |
| 3,562,427 | 2/1971 | Yano et al. | 474/70 X |
| 3,576,485 | 4/1971 | Coons et al. | 318/434 |
| 3,585,477 | 6/1971 | Shacknow | 318/490 X |
| 3,657,937 | 4/1972 | Lambert | 474/37 |
| 3,736,486 | 5/1973 | Gould et al. | 318/624 |
| 3,954,018 | 5/1976 | O'Berto | 474/11 |
| 4,122,974 | 10/1978 | Harbert et al. | 474/29 X |
| 4,191,913 | 3/1980 | Arnold et al. | 318/678 X |
| 4,211,967 | 7/1980 | Akiyama et al. | 318/490 |
| 4,335,341 | 6/1982 | Ogasawara | 318/624 |
| 4,357,806 | 11/1982 | Harris et al. | 474/11 X |
| 4,394,606 | 7/1983 | Woerwag | 318/434 |
| 4,463,296 | 7/1984 | Tada et al. | 318/678 X |
| 4,481,452 | 11/1984 | Kitano et al. | 318/678 X |
| 4,506,203 | 3/1985 | Redmond | 318/678 X |
| 4,513,417 | 4/1985 | Lamb et al. | 371/62 X |
| 4,538,099 | 8/1985 | Moon | 318/678 |
| 4,618,953 | 10/1986 | Daniels et al. | 371/62 X |
| 4,636,961 | 1/1987 | Bauer | 318/490 X |

OTHER PUBLICATIONS

Brochure entitled "SmartTrol Drive System Regulator" authored by T. B. Wood's Sons Company, Chambersburg, PA.
Brochure of Reliance Electric entitled "Reeves X-V Moto Drive" p. G-64 of Reliance Electric catalog entitled "Mechanical Adjustable Speed Drives".
44Technical Guide for "DISCTRAC" Mechanical Adjustable Speed Drive, Reliance Electric Co., 1985.

Primary Examiner—Leslle A. Braun
Assistant Examiner—Harold F. Macris
Attorney, Agent, or Firm—Dority & Manning

[57] ABSTRACT

A mechanically adjustable variable speed drive includes an electric actuation apparatus which can be controlled by an analog embodiment or a digital circuitry embodiment. A speed change actuator is automatically and mechanically adjustable, such as with a controlled servomotor. A tachometer determines the actual rotational speed of a drive shaft, which is compared in a digital controller with a manually set desired rotational output speed. The digital controller (or an analog circuit in the case of the analog embodiment) controls the servomotor to adjust the mechanically adjustable variable speed drive. An automatic deadband means inhibits driving of the servomotor whenever the tachometer signal and the desired speed setting signal is within a predetermined deadband, which deadband is adaptively changed responsive to various conditions. The rotational information, both desired and actual, may be displayed, with display of the desired speed prior to actual operation of the drive being used to accurately preset the desired speed.

20 Claims, 7 Drawing Sheets

VARIABLE SPEED DRIVE

This is a continuation-in-part (CIP) of applicaton Ser. No. 06/757,466, filed July, 22, 1985, which was abandoned upon the filing hereof.

BACKGROUND OF THE INVENTION

Heretofore, variable speed drives have normally included a drive motor which operated at a constant output speed. Positioned on the output shaft of the drive motor was a pair of disks which were axially displaceable. An output drive shaft was spaced from the output shaft of the motor and had another pair of axially displaceable disks provided thereon. A belt extended between the pair of disks carried on the output shaft of the drive motor and the disks carried on the output shaft of the variable speed drive. In order to vary the coupling between the output shaft of the motor and the output shaft of the variable speed drive, a cam arrangement was used for axially displacing one of the disks carried on the output shaft of the motor. This in turn caused the belt extending between the two pair of disks to be radially displaced so as to vary the output speed of the output shaft of the variable speed drive. In one particular application such as being manufactured by Reliance Electric and referred to as Reeves XV Motor Drive, a hand wheel was coupled through gears to the cam for rotating the cam in order to displace the axially displaceable disk carried on the output shaft in order to adjust the output speed of the variable speed drive.

Automatic closed loop drive systems have also been used in the past and one such device is manufactured by Reliance Electric and is referred to as an ERC Package Control System. In that particular device, there is a magnetic pulse pickup for sensing the RPM of the output shaft of the variable speed drive. These pulses indicating the RPM of the output shaft of the variable speed drive are fed to a transmitter which in turn transmits a signal to a customer computer control center. At the customers' computer control center, a signal indicating the desired output speed of the variable speed device is generated and fed to an amplifier which is used for controlling an electronic remote control (ERC) for the variable speed drive. The ERC is equipped with a control motor that by rotating in one direction makes the output shaft of the variable speed drive go faster and rotating in the other direction go slower. A potentiometer is physically connected to the control motor shaft that is used for adjusting the output speed of the variable speed drive and generates a signal indicating the physical position of the arm. The potentiometer in turn is connected to the amplifier for making correction signals for the variable speed drive.

Another drive system is manufactured by T. B. Woods Sons Company of Chambersburg, Pa. In the Woods' device, there is a control motor associated with the variable speed drive for physically moving the input drive motor relative to the output drive shaft of the variable speed device for varying the output speed of the variable speed drive. The control motor is connected to a screw which upon being rotated physically moves the input drive motor back and forth to vary the output speed of the drive. A correction signal is produced by a circuit for driving the control motor for physically shifting the coupling between the input drive motor of the variable drive and the output shaft of the variable drive. While the Woods' device does disclose an automatic circuit for maintaining the desired speed of the output signal, there is no dead band adjustment in the Woods' drive system.

SUMMARY OF THE INVENTION

Accordingly, an important object of the present invention is to provide a speed sensitive variable speed drive.

Another important object of the present invention is to provide a variable speed drive that automatically maintains a desired output speed regardless of variations in loads and minor variations in line voltage.

Still another important object of the present invention is to provide a speed sensitive variable speed drive that is quite stable as a result of utilizing a dead band circuit that only permits variations in the output speed of the drive when a predetermined correction is required.

Still another important object of the present invention is to provide a speed sensitive variable speed drive that is equipped with circuitry that limits the maximum and minimum correction signal that is used for adjusting the output speed of the variable speed drive to correspond with the desired output speed of the variable speed drive.

Still another important object of the present invention is to provide an automatic control for an adjustable speed belt drive that is a closed loop system that has an internal feedback signal associated therewith. These and other objects may be more fully understood from the following.

Yet another important object of the present invention is to provide an improved controller for controlling a variety of types of mechanically-adjustable variable speed drives. The precision of such a controller in an improved digitally-based embodiment thereof further disclosed herein generally addresses and improves the sometimes slow and slightly unstable performance of mechanically-adjustable variable speed drives, as more particularly discussed herein below.

One variable speed drive in accordance with the present invention includes an electric motor having a substantially constant speed on its output shaft. A first pair of spaced disks are carried on the output shaft of the motor with one of the disks being fixed to the output shaft and the other disk being axially adjustable on the shaft. An output drive shaft is spaced from the output shaft of the motor and has a second pair of spaced disks carried thereon with one of the disks being fixed to the output drive shaft and the other disk being axially adjustable on the output drive shaft. The distance between the axis of the output shaft of the motor and the output drive shaft of the drive is fixed and a drive belt extends between the two pair of disks for driving the output drive shaft from the output shaft of the motor. Means is provided for varying the spacing between the disks of each respective pair of disks for varying the output speed of the output drive shaft by radially shifting the drive belt between the two pair of disks. In one particular embodiment the means for varying the spacing between the disks of the first pair of spaced disks includes a cam member carried on the end of the shaft that is in turn driven by an electric control motor for rotating the cam. As the cam is rotated, the axially adjustable disk carried on the output shaft of the motor is shifted for radially displacing the belt between the two pair of disks.

Means is provided for generating a signal indicating the actual RPM's of the output drive shaft. In one particular application this means includes a magnetic pickup that generates a frequency corresponding to the output speed of the output drive shaft. This frequency is converted to a voltage and is in turn fed to one input of a controller. The controller has another input to which a signal indicating the desired output speed of the output shaft is supplied. The controller means generates a correction signal responsive to the signal indicating the RPM's of the output drive shaft and the signal indicating the desired output speed of the output drive shaft. This correction signal is supplied to a speed control motor which rotates the cam for adjusting the drive belt to adjust the output RPM's of the output drive shaft to the desired speed of the output drive shaft.

The controller includes a first and second control circuit for energizing and driving the electric speed control motor in different directions responsive to the correction signal. A dead band circuit is connected to the first and second control circuit for inhibiting the driving of the electric speed motor when the correction signal is within a predetermined amplitude range so that the control motor is not energized and driven unless the correction signal is outside the predetermined amplitude range. The controller also includes electrical means for setting a maximum speed adjustment of the output drive shaft and a minimum speed adjustment for the output drive shaft. The controller means includes a comparator that is used for producing the correction signal responsive to the signal indicating the desired output speed of the output drive shaft and the signal indicating the actual output speed of the output drive shaft.

The circuit is also provided with means for producing biasing voltages for setting the maximum and minimum speed adjustments for the output shaft of the variable speed drive. These biasing voltages may be combined in a summing junction with the signal indicating the desired output drive shaft speed prior to that signal being input to the comparator for producing the correction signal.

In general, both the presently disclosed analog embodiment and the digitally-based embodiments of the present invention may be used with different types of mechanically-adjustable variable speed drives. In particular, FIG. 1, discussed herein below, illustrates a V-belt type cariable speed drive. A control motor (or equivalent controllable actuator means) associated therewith physically actuates elemetns which in turn change the speed ratio between an input and output shaft thereof. In a similar fashion, another variable speed drive (for example, the "DISCTRAC" disc-type drive distributed by the Reliance Electric Company) also has actuable elements which vary the speed ratio between an input and output shaft of the variable speed drive. In such instance, the power flow between such shafts is variably provided with opposing pairs of friction discs and rings, the radius of the contact areas of which are varied to determine the output to input speed ratio of the drive.

A generic mechanically-adjustable variable speed drive in combination with a digital controller in accordance with the present invention may include: a mechanically-adjustable variable speed drive, having an input shaft and an output shaft drivingly coupled thereto, and an actuable member operatively associated with such shafts for mechanically adjusting the drive ratio therebetween; power input means for rotatably driving such variable speed drive input shaft at a substantially constant speed; actuator control means for controllably adjusting the position of the variable speed drive actuable member so as to mechanically adjust the output speed of the output shaft thereof relative the substantially constant speed of the input shaft thereof; tachometer feedback means for sensing the rotational speed of the variable speed drive output shaft and providing a tachometer signal corresponding to same; speed setting means for providing a speed signal corresponding to a user-defined desired speed for the variable speed drive output shaft; and digital controller means, responsive to the tachometer signal and the speed signal, for driving the actuator control means so as to maintain the variable speed drive output shaft at the desired speed thereof.

In general, the present digital controller comprises an improved version of the presently disclosed analog controller, and more particularly addresses further prior art disadvantages concerning the control of mechanically-adjustable variable speed drives. For example, making speed adjustments with such drives may be relatively slow. In some instances, as much as 40 seconds or more may be required to mechanically vary a drive between its minimum and maximum speeds. Thus, changing the speed settings on such a drive can require long waits between adjustments and guess work resulting in multiple adjustments to achieve a desired output speed. One aspect of the present invention particularly addresses such prior art disadvantage by providing the above-mentioned digital controller means with a further preset means for operating the controller means in a preset mode for inhibiting driving of the actuator control means, while a newly desired speed setting is accurately established, and without guess work.

Another known disadvantage of mechanically-adjustable variable speed drives is that they are relatively unstable. In other words, they are known to continuously have slight variations in the output speeds thereof. If a control system were too precise in responding to such variations, it might undesirably hunt about the desired speed setting. While control systems in general are known to have response dead bands to reduce hunting problems, the present invention as a further aspect thereof includes an improved dead band feature by providing the digital controller means with an automatic dead band means for adapting to changes in the relationship between a tachometer feedback signal and a desired speed signal by automatically adjusting the width of a response dead band used by the controller means in driving the variable speed drive.

Also, different embodiments of the present invention are not limited to only an electronic controller in combination with a mechanically-adjustable variable speed drive, but also include embodiments of such controllers adapted for use with such variable speed drives.

These and many other features of the present invention, including both the analog and digitally-based embodiments thereof, are set forth more particularly in the flowing specification.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein several exemplary embodiments are shown and wherein.

DESCRIPTION OF THE PREFERRED EMBODIMENT

Figure 1:
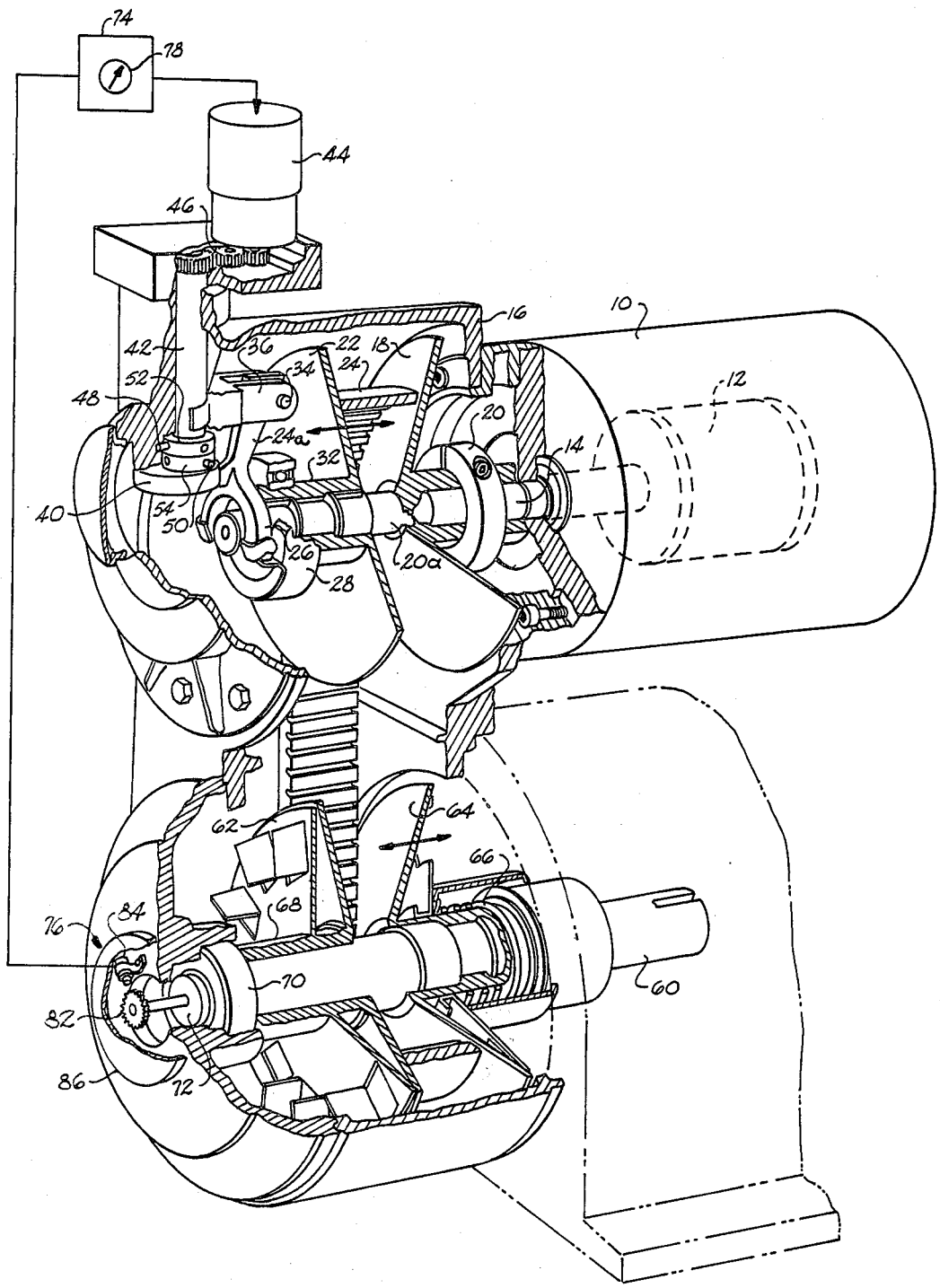
FIG. 1 is a perspective view partially in section illustrating a variable speed drive constructed in accordance with the present invention.

Referring to FIG. 1 there is illustrated an electric drive motor 10 having an armature 12 with an output shaft 14 projecting outwardly therefrom. The electric motor is bolted to a housing 16 which surrounds the entire variable speed drive. The motor is an alternating current fixed speed motor. A first disk 18 is secured to the outer end of the output shaft 14 by means of a lock collar 20 which extends about an axially extending flange provided on the disk 18. Disk 18 is fixed to the shaft 14 by any suitable means such as a key. Another coupling shaft 20a has one end projecting into and fixed by means of a key to a bore provided in the disk 18. The other end of the shaft 20a projects outwardly therefrom. The shaft 20a is merely an extension of the output shaft 14 of the motor and is hereinafter referred to as the output shaft of the motor. Spaced from the disk 18 is an axially adjustable disk 22 which in cooperation with disk 18 forms a pair of disks that are used for driving a coupling driving belt 24. The disk 22 can be adjusted axially on shaft 20a by pressing against a yolk 24a that has a lower end 26 extending on opposite sides of the shaft 20a. The lower end 26 of the yolk 24a pushes against a housing of a bearing 28 which is in engagement with a flange 32 carried on the disk 22.

The upper end of the yolk 24a is connected by a pivot pin 34 extending between a pair of spaced arms 36. The arms 36 are in turn fixed to the housing 16. The yolk 24a is pivoted about pin 34 by means of an eccentrically mounted cam 40. The cam 40 is carried on the lower end of a vertically extending shaft 42.

The shaft 42 and the cam 40 are driven in one or the other direction by means of a control motor 44. Suitable gearing 46 is provided between the output shaft of the control motor 44 and the upper end of the vertical shaft 42. The control motor merely rotates the cam 40 a predetermined number of degrees for selectively forcing the yolk 24a in and out. As yolk 24a is forced in and out such causes the disk 22 to be axially displaced relative to the fixed disk 18. When this occurs, the belt 24 extending between the first pair of disks 18 and 22 is radially adjusted.

Of course, control motor 44 and gearing 46 thereof may be used in conjunction with actuating other types of mechanically-adjustable variable speed drives, such as the "DISCTRAC" drive discussed above. The principles involved are substantially the same, in that an actuator control means (for example, control motor 44) is controllably driven by a controller means, such as controller 74 discussed herein below (or other equavalent embodiments thereof), to adjust the variable speed drive to obtain the desired output on the output shaft thereof. Controller 74 discussed below is exemplified by the basically analog circuitry of present FIG. 2. Of course, other embodiments of the present invention, including digitally-based controllers, may be substituted for controller 74.

In order to limit the maximum and minimum amount that the yolk 24a can be moved by the cam 40, radially projecting pins 48 and 50 are positioned on collars 52 and 54 respectively. The angular spacing between the pins 48 and 50 controls the maximum amount of movement that can be imparted to the axially adjustable disk 22. The pins 48 and 50 strike abutments (not shown) for limiting the rotation of the cam 40.

Spaced a fixed distance from the output shaft 14 of the motor 10 is an output drive shaft 60 for the variable speed drive. Positioned on the output shaft 60 is a second pair of disks which includes disk 62 that is fixed to the output shaft 60 and an axially displaceable disk 64. The axially displaced disk 64 is forced towards the fixed disk 62 by means of a conventional concentrically wound compression spring 66. The fixed disk 62 has a flange 68 provided thereon through which the output shaft 60 extends. The flange 68 abuts against a bearing 70 extending around and supporting an outer end 72 of the output shaft 60. Any suitable device can be coupled to the output shaft 60 and in one particular instance a gear reduction box is coupled to the output shaft 60. Such is not further discussed since such is conventional.

The belt 24 which passes between the first pair of disks 18 and 22 also extends between the second pair of disks 62 and 64 and is in driving relation thereto. As a result, the output speed of electric motor 10 is imparted to the output drive shaft 60 through the drive belt 24. The degree of coupling can be adjusted by axially shifting the disk 22 of the first pair of disks. When this happens, the belt 24 is shifted radially. The disks 18, 22, 62 and 64 have inclined inner surfaces so that when the disk 22 is shifted axially towards the fixed disk 18, the belt extending therebetween is shifted radially outward. This, in turn, causes the belt extending between the second pair of disks which includes disks 62 and 64 to be shifted radially inward. As a result, the output speed of output drive shaft 60 is varied responsive to the axial movement of the disk 22. The spacing between disks 62 and 64 of the second pair of disks is shifted by the force of the belt 24 pressing against the inner surfaces thereof against the compression spring 66.

The variable speed drive discussed in connection with FIG. 1 up to this point is conventional and similar to the variable speed drives being sold by Reliance Electric discussed above.

One of the presesnt improvements to the variable speed drive includes placing a controller 74 between a means 76 for generating a frequency signal indicating the actual RPM's of the output drive shaft 60 and the control motor 44. A mechanically manipulatable knob 78 is provided on one embodiment of the controller for setting the desired speed for the output drive shaft 60 of the variable speed drive. The frequency signal produced by the signal generating means 76 is fed to the controller which in turn compares the signal which indicates the actual output speed of the output shaft 60 with a signal that is produced by manipulating the knob 78 representing the desired output speed of the shaft 60. If the two signals don't come within a predetermined range, then a correction signal is fed to the electric speed control motor 44 which rotates in one or the other direction to rotate the cam 40 to adjust the coupling between the output shaft 14 of the motor and the output drive shaft of the variable speed drive to bring the speed of the output drive shaft 60 to the desired speed.

The means for sensing the actual output speed of the shaft 60 includes a wheel 82 which has teeth thereon. A magnetic pickup 84 generates a frequency signal corresponding to the RPM's of the gear wheel 82. Any other suitable signal generation means could be used for generating the frequency signal. The magnetic pickup and gear wheel 82 is enclosed in a housing 86 so that all of the moving parts of the variable speed drive are enclosed.

Figure 2:
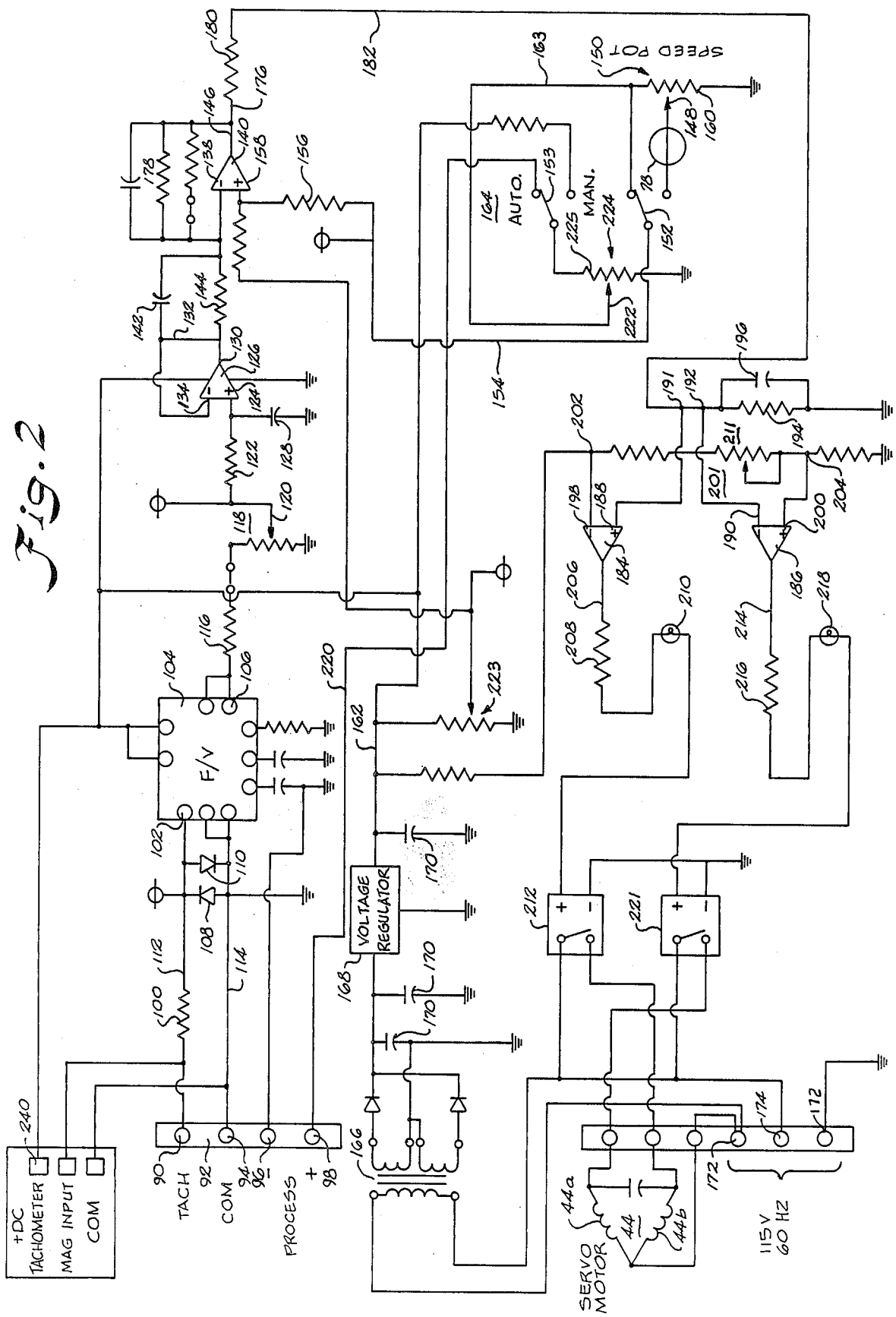
FIG. 2 is a schematic diagram of a controller used in conjunction with the variable speed drive of FIG. 1 for automatically maintaining substantially constant output speeds.

Referring now to FIG. 2 of the drawing, there is illustrated schematically an electrical diagram of one embodiment of the controller 74. The electric speed control motor is represented by the windings 44a and 44b shown in the left hand lower corner of FIG. 2. Depending upon which of these windings is energized the speed control motor 44 will be rotated in one or the other direction.

The frequency signal produced by the magnetic pickup 76 representing the actual speed of the output shaft 60 is fed to terminal 90 on the terminal block 92 located in the upper left of FIG. 2. This signal is in the form of a plurality of serial pulses, the frequency of which is directly proportional to the output RPM of the output drive shaft 60. Also carried on terminal block 92 is a common line terminal 94 and terminals 96 and 98 which are indicated by the plus and minus signs which are provided for receiving signals from an external source when it is desired to control the speed of the output drive shaft 60 from external signals rather than by manipulating the knob 78 shown in FIG. 1.

The series of pulses, frequency of which represent the RPM of the output shaft 60, coming in terminal 90 are fed through a resistor 100 to an input terminal 102 of a frequency to voltage converter 104. The frequency to voltage converter 104 in turn generates a signal on output terminal 106 having a voltage which corresponds to the frequency of the input signal applied to the input terminal 102. Limiting diodes 108 and 110 are connected between leads 112 and 114 for limiting the voltage that can be applied to the input of the frequency to voltage converter 104 so as to minimize the damage to such in case there is an excessive voltage applied to the input terminal.

The output voltage from the frequency to voltage converter 104 is fed through resistor 116 which is connected to a potentiometer 118. The wiper arm 120 of potentiometer 118 is connected to a resistor 122 that is in turn connected to the positive input 124 of an operational amplifier 126. An input filter capacitor 128 is connected between the positive input terminal 124 and ground. A feedback circuit is connected to the output terminal 130 of operational amplifier 126 and includes a shorting lead 132 which is connected back to the negative input terminal 134 of the operational amplifier 126. The purpose of the operational amplifier 126 is primarily for impedance matching.

When there is a high impedance on the input side of the operational amplifier 126 the operational amplifier 126 matches the high impedance on the input side with a high impedance on the output side so that components of a smaller size can be used in the circuit. The output voltage from the operational amplifier 126 is applied to a negative terminal 138 of operational amplifier 140 through a phase compensation network consisting of capacitor 142 and resistor 144. The operational amplifier 140 acts as a comparator means for comparing the signal indicating the actual speed of the output drive shaft 60 with a signal produced to indicate the desired output speed of the output drive shaft 60 and produces a correction signal on the output terminal 146 corresponding to the difference therebetween. The signal being produced by the magnetic pickup 76 is fed to the feedback leg 138 of the operational amplifier 140 to be compared as previously mentioned with a signal produced by the summation of a signal produced by the manually operated knob 78, that in fact is the wiper arm 148 of speed pot 150, and a biasing voltage produced by the wiper arm of pot 223. The signal produced by the speed pot 150 indicating the desired operational speed of the output shaft 60 is fed through switching element 152 over lead 154 through resistor 156 to the positive input terminal 158 of operational amplifier 140. Summation of the speed pot signal with the biasing voltage of pot 223 occurs at a summing junction just prior to the input of the speed pot signal to positive terminal 158. The resistor element 160 of the pot 150 has one side connected to ground and the other side connected to a lead 162 through lead 163 which acts as a fixed voltage source. This fixed voltage source is produced by transformer 166, voltage regulator 168 and associated filter capacitors 170. The input of transformer 166 is connected to a conventional 115 volt ac supply across terminals 172 and 174.

The transformer 166 steps down the 115 volts to approximately 18 volts in one particular application and the regulator causes it to be approximately 12 volts dc on line 162. The signal produced by the setting of knob 78 associated with the wiper arm is fed by means of lead 152 to the positive terminal of operational amplifier 140 as previously discussed.

The operational amplifier 140 compares the signal on the input terminal 158 with the signal appearing on the input lead 138 and generates an error or correction signal on output lead 176. This error signal is fed back through feedback network 178 to terminal 138. The error or correction signal is also fed through resistor 180 over lead 182 to operational amplifiers 184 and 186 which forms part of a first and second control circuit respectively. A positive terminal 188 of operational amplifier 184 is tied to the negative input terminal 190 of operational amplifier 186 through junctions 191 and 192. A divider network consisting of resistor 194 and capacitor 196 is provided for limiting the output voltage of operational amplifier 140 to an operating range for the operational amplifiers 184 and 186.

The two operational amplifiers 184 and 186 are provided for generating signals for operating the control motor 44 to rotate such in one or the other direction in order to displace the drive belt 24 for varying the output speed of output drive shaft 60.

The negative input terminal 198 of operational amplifier 184 and the positive input terminal 200 of operational amplifier 186 are fixed to different voltage reference points. Voltages under control of potentiometer 201 are applied to junctions 202 and 204. The purpose of the potentiometer 201 is to vary the dead band range of operational amplifiers 184 and 186. If the potential of junction 204 is the same potential as junction 202, then the dead band range is zero.

Of course, it is desireable to have some differences in the potential between the two junctions 202 and 204. The purpose of this is to prevent hunting when it is desired to either increase or decrease the speed of rotation of the output drive shaft 60 responsive to an error signal appearing at the output of comparator 140. This produces a more stable performance for the variable speed drive.

Depending on the error signal coming in on lead 182, it will either cause the operational amplifier 184 or 186 to be energized. It is one or the other, but not both. Assuming that operational amplifier 184 is energized, a signal will be supplied to output lead 206 through resistor 208 to lamp 210 indicating that the speed is to be increased. When the lamp 210 is energized, the correction is taking place. The signal being fed over lead 206 is in turn fed to a solid state relay control device 212 that is connected to the control winding 44b of the control motor 44. Depending on whether winding 44a or 44b is energized, the motor will be driven in one or the other direction for making the speed adjustment.

If the operational amplifier 186 is energized, a signal is produced on its output 214 through resistor 216 and lamp 218 to a solid state relay control device 221 for supplying current through the winding 44a in an opposite direction from when the solid state relay control device 212 is energized. The dead band circuit 211 which is interposed between the voltage comparator means 140 and the first and second control circuits which includes operational amplifiers 184 and 186 is provided for activating either the operational amplifier 184 or 186 only when the correction voltage is outside a predetermined range. This range is set by the wiper arm of the potentiometer 201.

Another advantage of this exemplary circuit constructed in accordance with the present invention is that an external signal can be applied to the terminals 96 and 98. The external signal can be used for varying the output speed of the drive rather than using the manually manipulatable knob 78.

When it is desired to use an external signal, the signal is connected as previously mentioned to the terminals 96 and 98. The switch 164 is placed in the automatic mode as shown in FIG. 2. This disconnects the manual speed pot 150 from the fixed internal reference voltage lead 162. The resistor portion 160 of the pot 150 is then connected to the terminal 98. In other words, the pot 150 is either connected to the fixed voltage lead 162 or the external terminal 98 depending on the mode that the switch 164 is placed.

When the switch 164 is appropriately manipulated, switching elements 152 and 153 are switched to the position shown in full lines. When in this automatic mode, the external signal is fed over lead 220 through switch 153, wiper arm 222 of pot 224, the switch contact 152 to terminal 158 of the comparator which includes the operational amplifier 140. As a result, signals from any suitable external source can be supplied to the comparator 140 for being compared with the signals being generated by the magnetic pickup 76 for controlling the output speed of the variable speed drive. When in the automatic mode, the switching terminals 152 and 153 are in the "up" position and the wiper arm 140 of the potentiometer 150 is completely disconnected from the circuit.

The circuit has a maximum speed adjustment which includes the wiper arm 222 forming part of the pot 224 which includes the resistor element 225. The resistor element 225 of the pot 224 is connected between lead 163 and the external signal coming in on terminal 98 through lead 220. The pot 224 sets the maximum value of the voltage that can be applied to terminal 158 of the operational amplifier 140. This in turn controls the maximum correction that can be applied to the motor 44 and in turn the output speed of the drive shaft 60.

A similar pot 223 is provided for setting the minimum correction that can be produced by the error signal and in turn the minimum correction applied to the output speed of the output shaft 60 of the variable speed drive. The signal produced by the pot 223 is also connected to the positive terminal 158 of operational amplifier 140.

In both the automatic and manual mode, the signal comes either from an external source 98 or a signal produced by the variable knob 78 and is connected to the terminal 158 of the comparator 140 through pot 224.

The purpose of the pot 223 is to place a minimum voltage on the terminal 158 of the operational amplifier 140 so that regardless of whether the knob 78 is set to zero or the input signal coming in on terminal 98 is zero, there will be a minimum voltage applied to the operational amplifier 140 causing the drive to be driven at a minimum speed. In this circuit, you cannot reduce the output below this minimum speed.

A visual display panel can be mounted in any suitable position to indicate the speed being registered by the magnetic pickup 76 and is shown in the schematic diagram by the display screen labeled tachometer in FIG. 2.

One of the advantages of the circuit disclosed above is that it provides a variable speed drive that includes a self-contained feedback loop wherein a frequency signal is produced that is directly proportional to the output speed of the variable speed drive output shaft 60 for making corrections to the output speed responsive to an error signal being produced. The error signal is produced by comparing a signal representing the desired output speed of the output shaft with the voltage corresponding with the frequency indicating the actual output speed of the output drive shaft 60.

The remainder of the specification more particularly concerns the digitally-based controller embodiment represented by present FIGS. 3-8.

Figure 3:
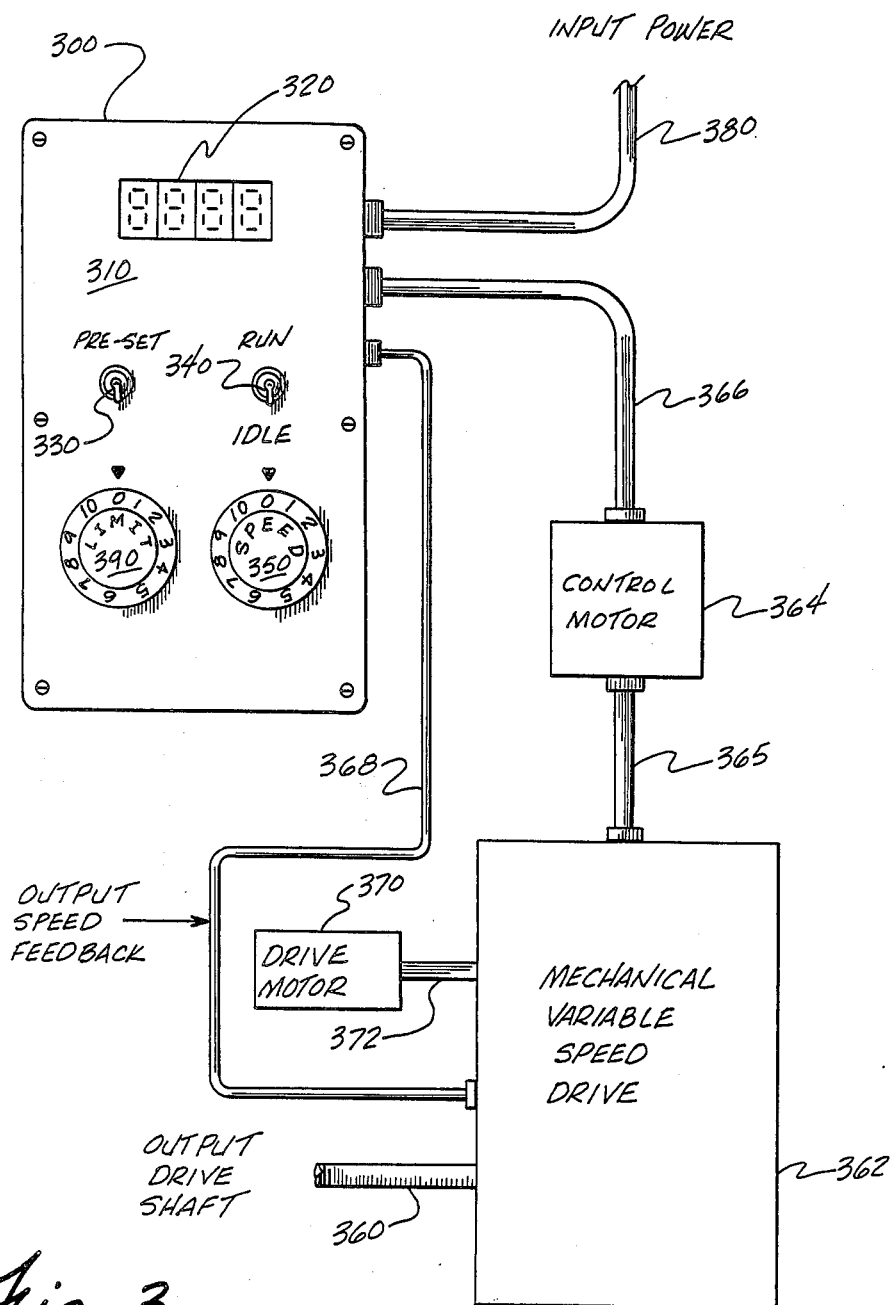
FIG. 3 is a schematic representation of a digitally-based embodiment of a controller in accordance with the present invention, with a generic representaion of a mechanically-adjustable variable speed drive (not to scale).

FIG. 3 illustrates a structure 300 essentially defining a housing for a controller in accordance with this invention. A similar such housing may be used to receive either an analog or a digital controller embodiment of this invention. different embodiments of this invention may have a number of adjustment features, with access to various of such features being within housing 300 (requiring opening thereof) and outside of housing 300. The present embodiment is only one example of the placement of such adjustment features, other placements of which are included aspects of this invention.

Control board 310 of housing 300 supports a display means 320, which in this instance comprises a four digit display of LED's or the like (more fully discussed below). Two toggle switches 330 and 340 respectively concenr PRESET and RUN/IDLE functions of the present invention. While such functions and other aspects of this embodiments are discussed more fully below, in s ummary the preset switch functionally permits a user to select with speed knob 350 a newly desired rotational speed for output drive shaft 360 of the generic representaiton of variable speed drive 362 without yet beginning to make such change. In an established preset mode, obtained by switching toggle switch 330 momentarily towards the present indice, the controller within housing 300 is temporarily inhibited from driving control motor 364 with combined power and control line 366 therefor. Control motor 364 is substantially analogous to control motor 44 of present FIG. 1, while the controller within housing 300 of FIG. 3 is generally analogous with control motor 74 thereof. Likewise, the output speed feedback 368 from variable speed drive 362 is substantially functionally equivalent with the actual rotational speed tachometer indication 76 which forms a feedback input to controller 74 of present FIG. 1.

While inhibiting driving of a control motor 364 in a defined preset mode, drive motor 370 (analogous to armature 12 of present FIG. 1) continues to provide a power input means for rotatably driving input shaft 372 of variable speed drive 362. Such input power means defined by drive motor 370 is distinguished, as understood by one of ordinary skill in the art, from the AC input power 380 supplied to the circuitry within housing 300. As further understood herein below, such AC input power on line 380 is also selectively output along line 366 so as to controllably drive control motor 364 (which forms substantially an actuator control means) for adjusting the drive ratio of output shaft 360 of variable speed drive 362 relative input shaft 372 thereof.

The controller within housing 300, during such preset mode, further causes a newly desired speed indication selected by a user with speed knob 350 to be shown on display means 320. Thus, the user can know exactly what new speed is being input. Upon release of momentary switch 330, the controller within housing 300 returns from the preset mode of operation thereof to its normal mode of operation, in which the control motor 364 is controllably driven so as to establish an output speed on output drive shaft 360 in accordance with the newly desired speed established with speed knob 350. Thus, the user accurately and efficiently changes the output speed with one simple rigorous (i.e. no guess work) procedure.

Such preset function therefore greatly enhances the ability of on-sight user to select and change the desired speed of a mechanically-adjustable variable speed drive. As discussed above, such variable speed drives can take relatively long times to adjust to desired speed settings. Hence, a user might need to wait for an extended period of time, for example 15 to 30 seconds, while the variable speed drive changes towards the newly desired speed setting. If a display only shows actual tachometer feedback, the user can never know exactly what new speed is being set, and multiple attempts to reach a specific speed can result. Each such attempt takes more time.

It is particularly important to keep in mind that throughout such attempts, the variable speed drive might be providing drive power to a large commercial load or process which requires a particular drive input. During the time that a required speed is not provided or maintained, the ultimate product being produced with such commerical processes may constitute waste to the manufacturer. Thus, multiple delays of 15 to 30 seconds simply to attempt to adjust the drive speed for the process can be very costly to the manufacturer.

Particular circuitry discussed herein below more specifically sets forth explains how such preset function is achieved in one exemplary fashion.

Toggle switch 340 when placed in its run position (upward in the FIG. 3 illustration) causes the controller within housing 300 to respond to the desired speed setting on speed knob 350. When placed in a downward position towards the idle indice, the desired speed indication from speed knob 350 is replaced with an internally-defined (i.e. board programmable) minimum speed setting. In other words, during an idle setting control motor 364 is selectively driven so as to automatically reduce the output speed of output drive shaft 360 to a predetermined minimum, without having to disrupt or change the setting on speed knob 350.

Limit knob 390 also relates to practical concerns associated with variable speed drive 362 providing input power to a real world load or process. Such real world process may have inherent or natural limits which are unrelated to inherent limits of variable speed drive 362, control motor 364, or the controller within housing 300. To account for such limits, a special load characteristic signal as defined by the user may be provided, and accepted by the present invention so as to maintain process activity within such established limits. Essentially, such user-defined load characteristic signals are input through limit knob 390, which essentially scales the user-defined process feedback signal so as to establish a limit threshold which the controller within housing 300 uses to prevent variable speed drive 362 from exceeding the desired process limits. This paragraph only summarizes the function behind limit knob 390, which is more particularly set forth and explained below.

FIG. 3 is a schematic representation only, and is not intended as drawn to scale. For example, housing 300 can normally form one of the smaller components of an overall system illustrated. However, from a schematic representation view point, FIG. 3 is highly useful to understand the significance of the control features of the present invention in interfacing with a mechanically-adjustable variable speed drive, and even special concerns (as alluded to above) of the process or load which may be powered by such drive.

Figure 4:
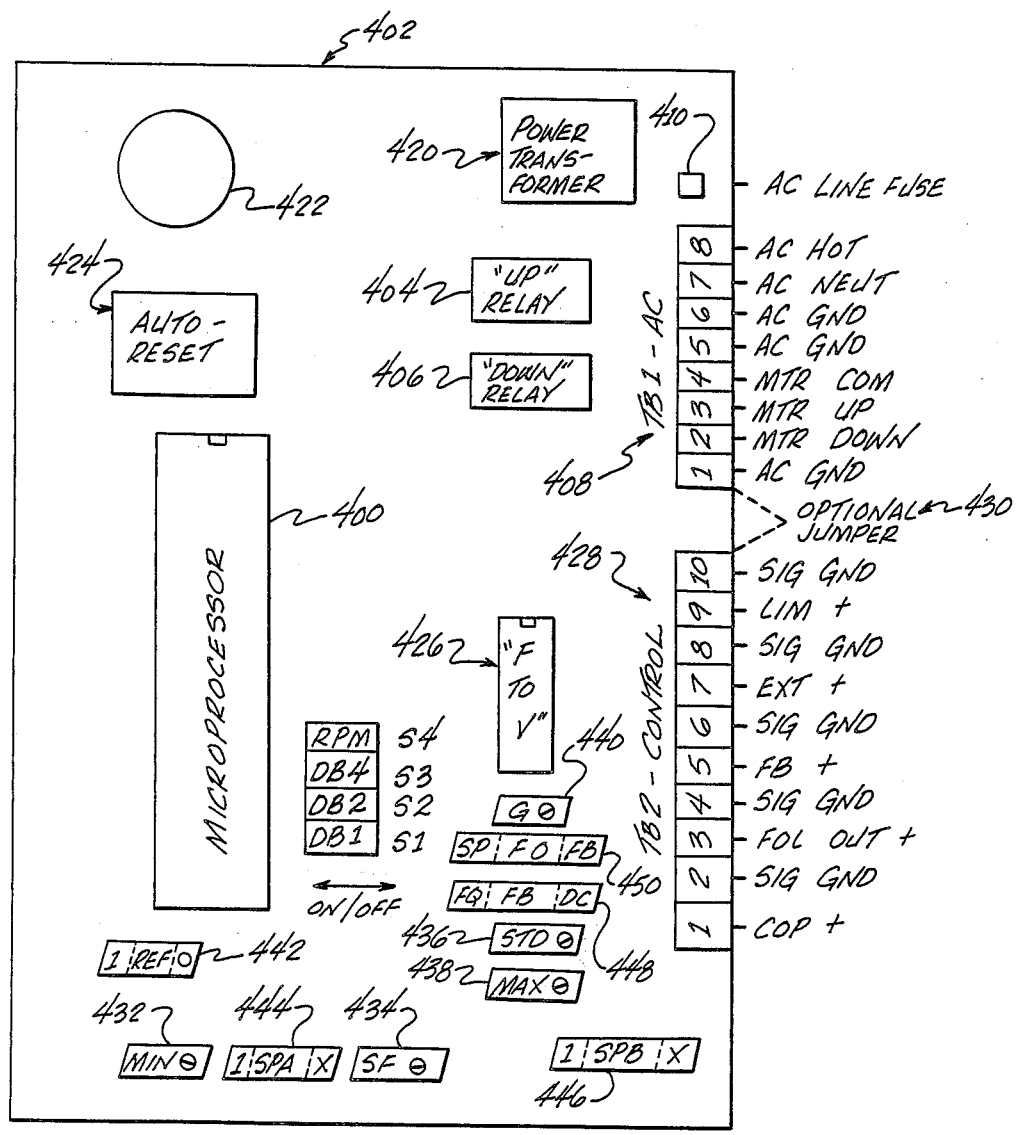
FIG. 4 is a schematic representation of an exemplary board layout for the digitally-based controlled represented in FIG. 3.

FIG. 4 illustrates an exemplary board layout of elements which may be mounted within a housing, such as housing 300 of FIG. 3, for providing a digitally-based controller in accordance with the present invention. In general, digital circuits themselves and board mounting thereof are well-known to those of ordinary skill in the art. Particular placement and mounting of such circuit elements are also subject to numerous design and aesthetic considerations. Hence, mere exemplary interconnections of the elements and features illustrated in FIG. 4 are omitted to more clearly illustrate the elements themselves. Likewise, all pin connections or representations thereof related to microprocessor 400 are omitted for clarity.

Micro-processor 400 is a multi-pin digital chip device which is typically mounted on a board 402, along with other peripheral circuitry elements which are associated therewith. Enlarged detail of microprocessor 400 is more particularly set forth and discussed with FIG. 5, below.

Essentially, microprocessor 400 controls respective up and down solid state relays 404 and 406, which in turn control the application of AC power to an actuator control means such as control motor 364. Motor 364 may comprise a servo motor (like 44) or other bi-directional motor which reverses depending on the polarity of power applied thereto. Relays 404 and 406 are also analogous to relays 212 and 221 of the analog circuitry of present FIG. 2. A terminal board or terminal strip 408 generally illustrates the board layout for interconnections with such motor 364. In particular, connections 2-4 of terminal board 408 may be connected to control motor 364 so as to selectively provide AC power thereto of selected polarity for alternately driving the motor in one of its two rotational directions. As understood by those of ordinary skill in the art, such rotational driving of control motor 364 in either upward or downward speed changes for output drive shaft 360 of variable speed drive 362.

For completeness, terminal strip 408 further illustrates on pins 5-8 thereof the incoming connections for AC input power, such as on line 380 of present FIG. 3. Further, alternatively, an AC line fuse 410 may be mounted on board 402 and wired between such AC power and the components on board 402 (as understood by those or ordinary skill in the art) for the protection of all such components. In particular, AC line fuse 410 may be interposed between the AC input power and a power transformer 420, which may be of various known designs. A schematic representation of an exemplary embodiment of such design is illustrated in present FIG. 8, discussed below.

One of the chief characteristics concerning power transformer 420 is that the power supply provided therewith (as more fully discussed with reference to FIG. 8) outputs several different voltage levels for supporting a variety of input voltage needs for the circuitry of FIG. 4. For example, microprocessor 400 and other chip elements on board 402 are typically powered by a five (+5) volt source. Power requirements for the various elements and circuitry mounted on board 402 are more particularly illustrated in present FIGS. 5-7, and discussed more fully herein below.

Figure 8:
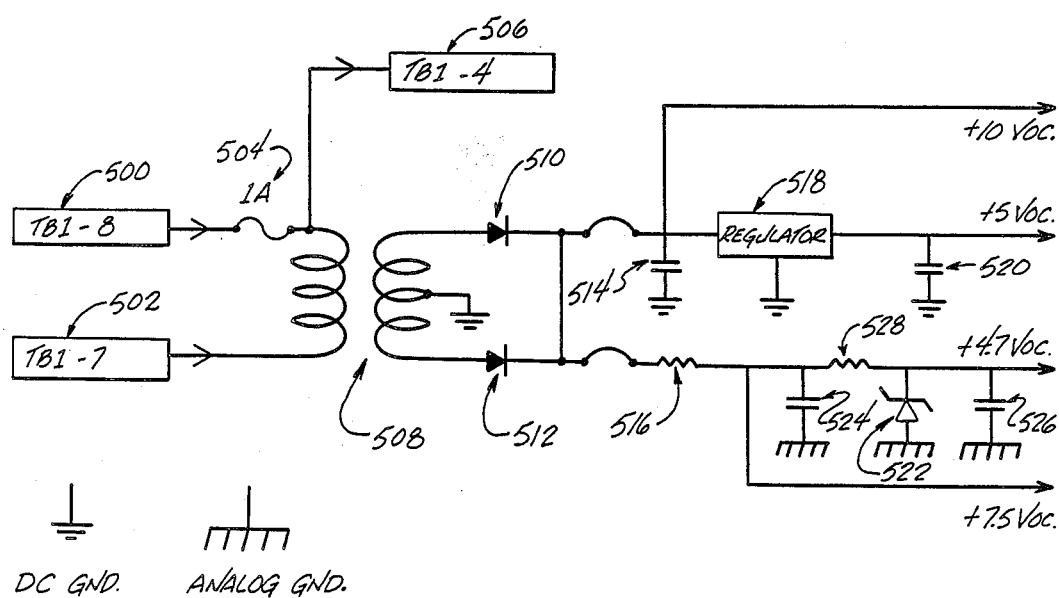
FIG. 8 is a schematic representation of one typical power supply configuration which may be used with the board layout exemplary embodiment of present FIG. 4.

Element 422 is intended to be a general representation of the normally relatively large capacitor which would be associated with power supply of FIG. 8. For example, a capacitor of 6800 microfarads could be used in one exemplary embodiment, and mounted on board layout 402 in the position illustrated in FIG. 4.

The auto reset device 424 may comprise an optional component of the illustrated embodiment of the present invention, and essentially be provided on a single chip which may be plugged in and out of board 402. As discussed more fully below, a particular output signal of microprocessor 400 may be monitored for indications of whether such microprocessor is operating properly. Upon indications of malfunction, auto reset device 424 would then automatically initiate reset functions for microprocessor 400. An exemplary embodiment of such optional auto reset device is more fully disclosed with FIG. 6, below.

The frequency to voltage converter device 426 is used in accordance with the present invention to convert frequency tachometer feedback signals (such as might be found on line 368 of FIG. 3) to voltage levels for use by microprocessor 400. Alternately, the output speed feedback signal itself may characteristically be a changing voltage level which may be directly accepted by microprocessor 400, without requiring conversion by a frequency to voltage converter 426.

TB 2 generally represents a second terminal board strip 428 which may receive and output various control signals for use with the circuitry mounted on board 402. In contrast, terminal strip 408 essentially concerned AC power connections. An example of the control signals with which terminal strip 428 is concerned is pin 5 thereof, which corresponds to the feedback signal just discussed with reference to frequency to voltage controller 426.

In particular, line 368 of FIG. 3 may be directly connected with pin 5 of terminal strip 428, with pin 6 thereof serving as a ground for such signal. Essentially, pins 2, 4, 6, 8, and 10 serve as signal grounds for respective signals indicated on pins 1, 3, 5, 7, and 9 of such terminal board. An optional jumper 430 may be utilized to connect pin 1 of terminal strip 408 (AC ground) with one of the signal ground pins of terminal strip 428 (eg. pin 10), all of which such signal ground pins may be connected with one another so that a common ground is conveniently achieved. Of course, the presently illustrated terminal strip layouts form merely exemplary layouts for one embodiment in accordance with the present invention, which invention need not be limited to such example.

The remainingg structures or features on board 402 not yet discussed may essentially be collectively referred to as "board programmable" features since they constitute board-mounted adjustable elements. The adjustments usually take the form of switches, trim pots, or jumper connections. For example, four switches, S1-S4 are used to provide inputs to microprocessor 400 which select the width of a response dead band used by the controller (switches S1, S2, and S3 corresponding respectively to DB1, DB2, and DB4) and additionally to select whether display means 320 of FIG. 3 displays data in a time mode or an inverse time mode.

Figure 7:
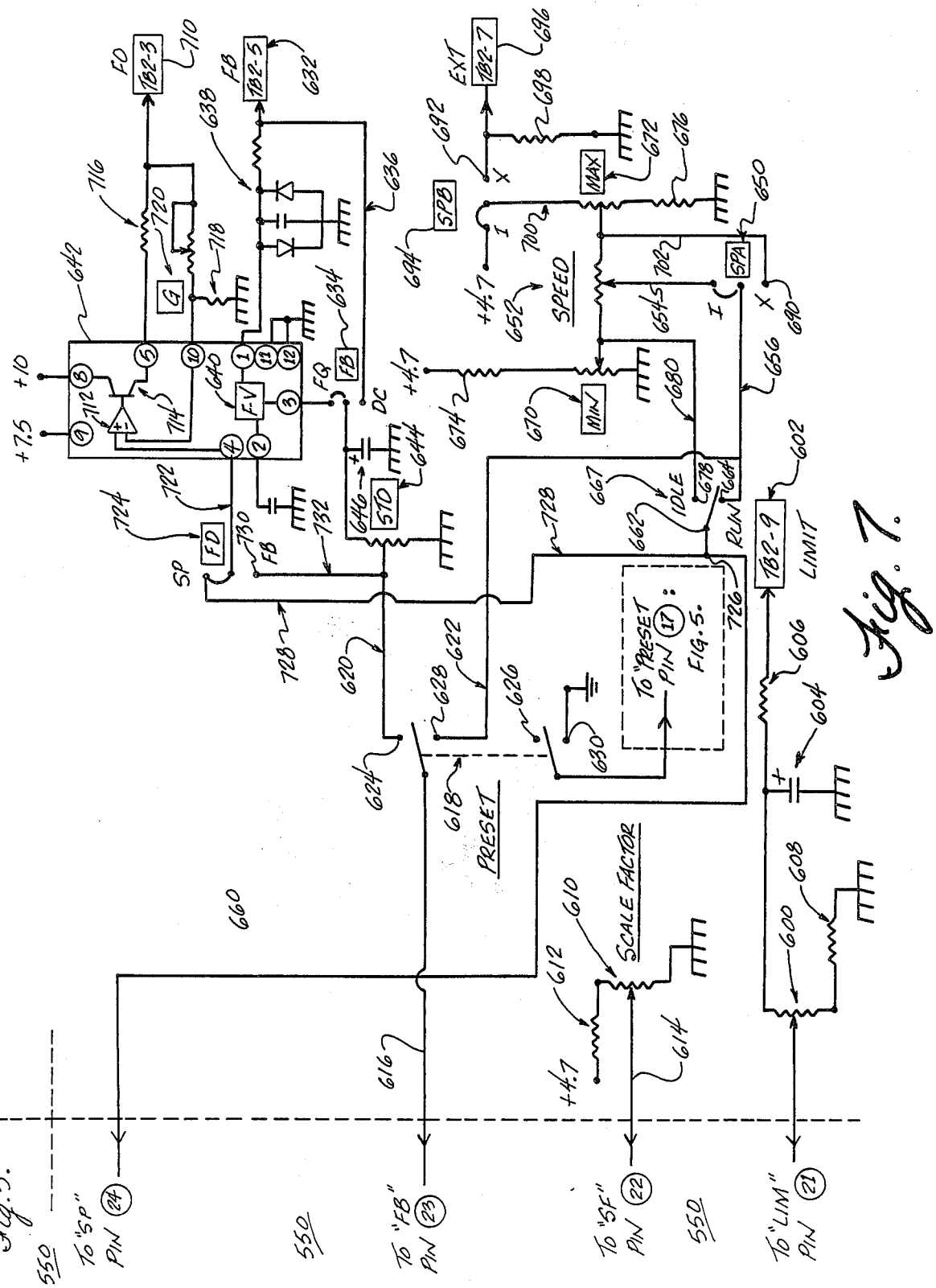
FIG. 7 illustrates analog circuitry for use in supporting the micro-controller of present FIG. 5 to provide a substantially digitally-based controller in accordance with the present invention.

The remaining circuit jumper clips and trim pots ultimately also affect inputs for microprocessor 400, but are nore directly associated with analog circuitry features such as illustrated in present FIG. 7. Inasmuch as all such features are discussed fully below with respect to such analog, circuitry, it suffices for the purposes of FIG. 4's illustration of an exemplary board layout of the present invention to merely indicate at this point that elements 432-440 concern trim pot mountings on board 402 while lemenets 442-450 constitute jumper elements on board 402.

Also, the remaining control signals shown on terminal board 428 are respectively associated with the signals delineated therein. For example, pin 9 of terminal board 428 is adapted to receive a user-provided characteristic load signal related to the limit function described iwth reference to limit knob 390 of FIG. 3. Pins 7 and 3 of terminal board 428 relate to external control signal inputs and control signal follower outputs for use with other similar controller devices in a master/slave configuration, as discussed more fully below with respect to FIGS. 5-7. Lastly, the COP signal of pin 1 of terminal board 428 related to an output signal for microprocessor 400 delineated as "computer operating properly", which as more fully described below is forwarded to auto reset device 424 for monitoring thereof so as to reset microprocessor 400 whenever same is not operating properly.

The remaining disclosure more particularly concerns FIGS. 5–8, which illustrate details of the digitally-based preferred embodiment represented by present FIG. 4. Referring first to FIG. 8, an exemplary schematic of a power supply, as referenced by power transformer 420 of present FIG. 4, is illustrated.

As shown, four discrete voltage levels are established by the power supply, those being 4.7 volts, 5 volts, 7.5 volts, and 10 volts. AC power inputs 500 and 502 are drawn from pins 7 and 8 of terminal strip 408 of FIG. 4, with the hot side thereof fed through a fuse 504 representing AC line fuse 410 (of approximately 1 amp). Such fuse-protected line may also be returned to pin 4 of terminal strip 408 as illustrated by connector 506, to serve as an AC common line for motor 364 (FIG. 3). AC input lines 500 and 502 are conventionally fed to a transformer 508, whose output is fed through rectifying diodes 510 and 512 for rectification. Filter capacitor 514, which goes to ground as does the secondary center tap of transformer 508, may comprise the relatively large capaciotr 422, referred to in conjunction with FIG. 4.

The DC output from rectifying diodes 510 and 512 is variously handled by the remaining circuitry of FIG. 8 so as to provide the four discrete voltage levels earlier discussed. For purposes understood herein below, the 7.5 volts and 10 volts references need not be highly regulated, and hence may be directly drawn from such rectifying diodes, as illustrated. A reducing resistor 516 is representatively used for dropping the 10 volt output to the desired 7.5 volts.

A known regulator circuit, including a regulator chip 518 and smoothing capacitor 520 may be used, as known, to provide the regulated 5 volt supply. The regulator chip MC68M05CT is one example of a conventional regulator chip known to those of ordinary skill in the art. In contrast, a zener diode circuit may be used to produce a highly-regulated 4.7 volt output, comprising zener diode 522, a pair of capacitors 524 and 526, and a resistor 528. While values for several of the cirucit elements illustrated in FIG. 8 have not been specifically provided, those of ordinary skill in the art will fully understand the representative power supply of FIG. 8, details of which do not form particular features of the present invention.

Figure 5:
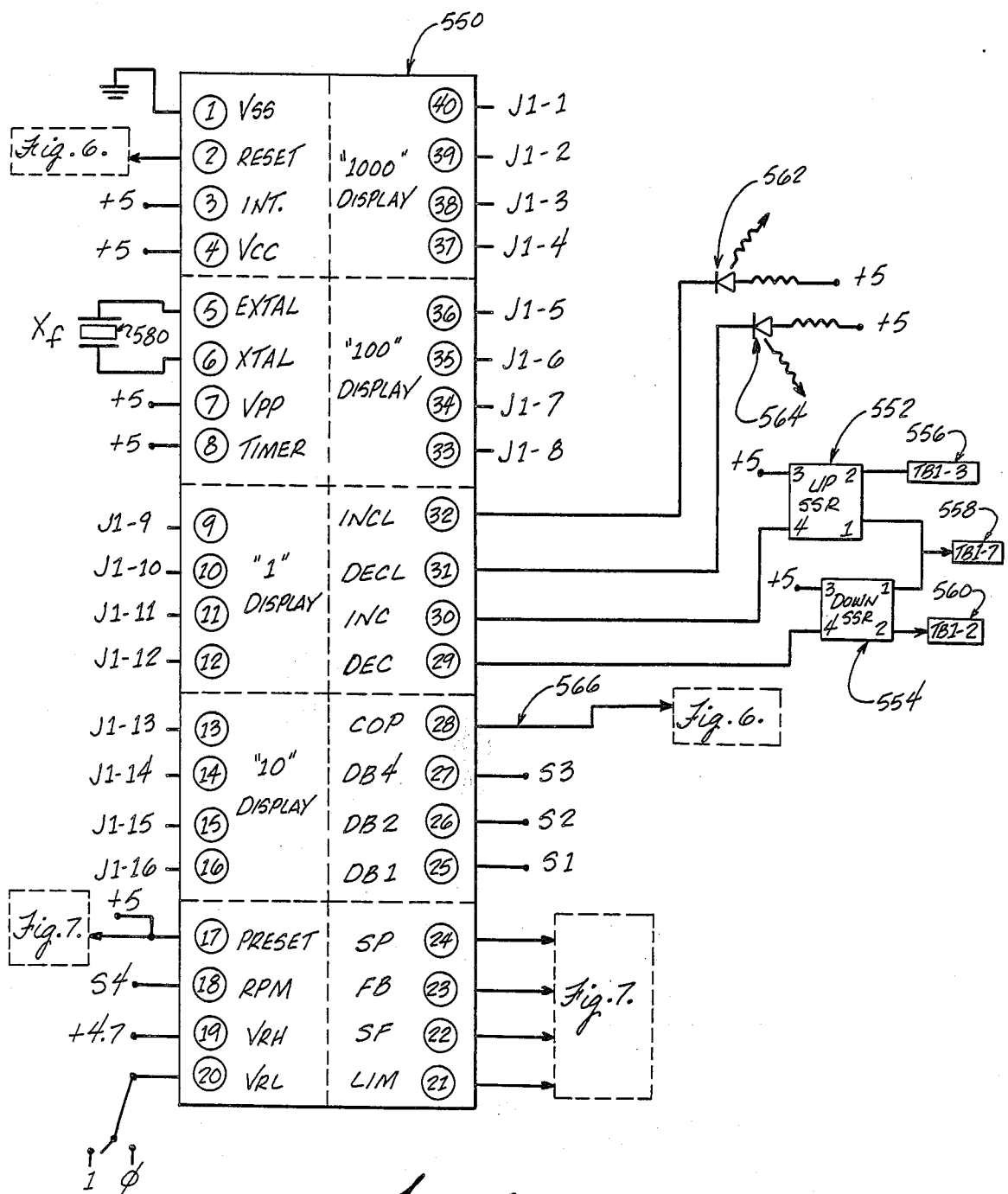
FIG. 5 is a more detailed schematic representation of a micro-controller for use with the embodiment of FIGS. 3 and 4.
Figure 6:
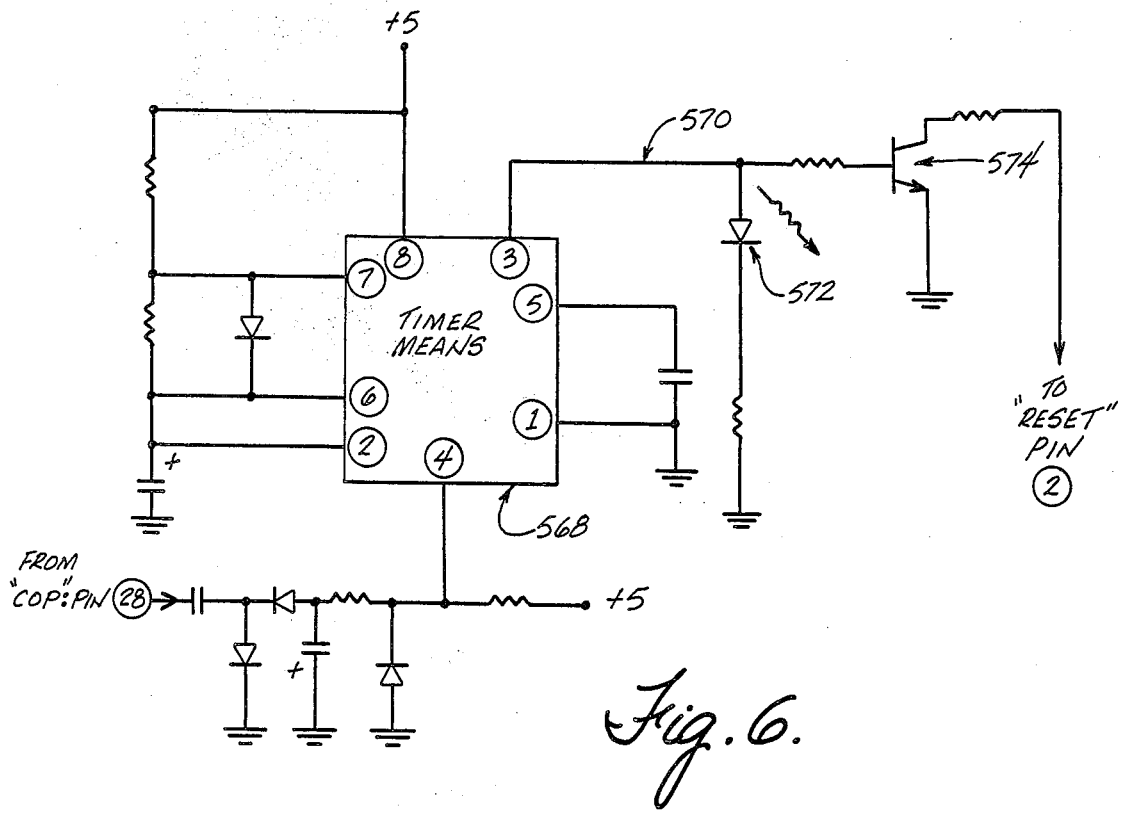
FIG. 6 illustrates an automatic reset means for optional use with the embodiment of FIGS. 3-5.

In comparison, present FIGS. 5–7 illustrate numerous features, which may be variously combined to comprise different emobidments of the present invention.

Referring now to such figures, microprocessor 550 may actually comprise a number of different embodiments, but preferably is a programmable micro-controller, such as the Motorola chip MC68705R35. Such micro-controller essentially comprises a combination of a microprocessor, further including an input section for directly receiving analog signals (with an internal a/D converter for handling same, as well as a separate input section for receiving more conventional digital inputs, and internal means for directly driving a display means. Of course, different chips could be used, as well as a separate A/D converter for inputs and driving means for a display. To the extent possible, FIGS. 5–7 are labeled with pin numbers and inter-connection identifications so as to be self-explanatory to one of ordinary skill in the art as to the structures and workings thereof. With clarity of the present description in mind, pin numers of micro-controller 550 (illustrated within circles on such micro-controller) are not separately provided with further reference characters.

Referring to FIG. 5, pin 9–16 and 33–40 of micro-controller 550 are directly associated with driving display means 320 of FIG. 3, and as illustrated are directly connected with jumper pins J1–1 through J1–16 (which were omitted from FIG. 4 for the sake of clarity). As illustrated, a four digit display 320 is driven, with four of such pins 9–16 and 33–40 being respectively grouped for each one of the four digits. As understood by those of ordinary skill in the art, micro-controller 550 outputs a binary coded decimal (BCD) signal on such grouped four lines, which are used to drive display means 320. While such display may assume different embodiments in accordance with the present invention, one typical embodiment thereof may include a family of so-called "four-line decoders" such as known decoder chips 74LS247, which in turn drive 7-segment display suchas known devices MAN6760. Such display elements may as a further feature of the present invention be associated with decimal jumper points, to permit manual adjustment of the decimal point of display means 320. Also, the decoder chips and segmented display devices may optionally be completely removed form a controller in acordance with the present invention, which does not require a display for providing a most of the features of this invention.

Throughout FIG. 5–7, the +5, +4.7, +7.5, and +10 designations are intended to indicate connections with the respective volatge outputs established by the power supply of FIG. 8, and further illustration of the interconnection therebetween is not required for an understanding thereof by those of ordinary skill in the art.

Pins 29–32 of micro-controller 550 all concern output control signals from micro-controller 550. For example, pin 30 (marked "INC" for "increase") powers an "up" solid state relay 552, while pin 29 (marked "DEC" for "decrease") provides a control input to "down" solid state relay 554. Such relays may Comprise various chips know to those of ordinary skill in the art, with chips P/B OZ1665 providing one example thereof, with SIGMA 230E2-5 being alternates therefor. Connectors 556, 558, and 560 are clearly marked for correspondence with the control motor up and down and AC neutral pins of terminal board 408 of FIG. 4. Thus, solid state relays 552 and 554 directly correspond with relays 404 and 406 illustrated on the board layout of FIG. 4, and are analogous to relays 212 and 221 of FIG. 2.

Pins 32 and 31 correspond to increase and decrease annuciators (i.e. lights), respectively, with LED's 562 and 564 being automatically lit to illustrate driving of control motor 364 in either the respective up or down direction, with the understanding that up/down refers to the output speed of output drive shaft 360 of variable speed drive 362, while the actual control inputs to motor 364 correspond to selection of the rotational direction of output shaft 365 thereof. LED's 562 and 564 may be externally mounted on control plate 310 of housing 300 (e.g. next to display means 320) so that a user may readily monitor whenever variable speed drive 362 is being controllably driven in either the increasing or decreasing speed direction. It is understood that the paired outputs 30 and 29, and 32 and 31 of micro-controller 550 are mutually exclusive, so that control motor 364 will be driven in only one rotational direction at a given time. The qeneration of outputs on such pins are subject to the various features and aspects of the present invention further discussed below.

Pin 28 of micro-controller 550 refers to the computer operating properly (COP) output signal thereof discussed with reference to pin 1 of terminal board strip 428 of FIG. 4. During proper opration, micro-controller 550 outputs a predetermined signal, such as a square wave at an exemplary frequency of 75 cps. As illustrated by FIG. 5, such COP signal may be output via line 566 to an autoreset means, such as illustrated in present FIG. 6. Essentially, such circuit comprises a timer means or multi-vibrator chip 568, such as an MC1455P or its equivalent. Use of such timer chips for various timing functions is well known to those of ordinary skill in the art, and thus the peripheral circuitry of FIG. 6 need not be discussed in detail.

As generally illustrated, the COP output signal from micro-controller 550 is input to pin 4 of timer chip 568. Discontinuance of such signal for any appreciable length of time, such as 1/10 or 2/10 of a second is indicative of improper operation by micro-controller 550. Timer means 568 is responsive to such discontinuance of the input to pin 4 thereof, for periodically firing on output pin 3 thereof. Such response and firing can occur within less than 1 second, and is conveyed along line 570 to an LED 572 for enunciation of such reset firing, and further to a transistor 574 which is thereby driven to pulse reset pin 2 of micro-controller 550 (see also FIG. 5).

Thus, the reset means of FIG. 6 monitors the loss of the COP signal from micro-controller 550 and responds thereto be periodically firing at approximately 1 second intervals during such loss so as to reset micro-controller 550 (if possible). Such resetting function is optional with given embodiments of the present invention, but where utilized is typically sufficient to reset micro-controller 550 after most causes of error therewith.

Referring again to FIG. 5, a number of pins on micro-controller 550 more particularly concern relative housekeeping aspects of such micro-controller, without concerning more particular features of this invention. For example, pin 1 related to $V_{ss}$ is merely strapped to ground so as to provide ground for micro-controller 550, while pin 4 related to $V_{cc}$ is connected to the 5 volt output from the power supply of FIG. 8 for providing a power input to micro-controller 550. Pin 3 on the other hand corresponds to an interrupt input for micro-controller 550 which is not utilized in the presently preferred embodiment. Hence, such input is arbitrarily strapped high and is not changed throughout operation of micro-controller 550.

Furthermore, pin 5 and 6 provide a necessary high frequency clocking input for micro-controller 550, as is common to virtually all types of microprocessors units. In this instance, the frequency $X_f$ of the crystal oscillator 580 is 4 megacycles. Pin 7 related to $V_{pp}$ concerns a control line for initially programming micro-controller 550. By using such control line once to "burn in" a program, such program may be confidentially preseved within micro-controller 550, as understood by those of ordinary skill in the art. Pin 8 refers to an internal timer which is similarly strapped high for non-use with the presently preferred exemplary emobdiment, similar to the treatment of pin 3.

The remaining pins of micro-controller 550 more particularly relate to circuitry including the switches, trim pots, and jumper pins mentioned with reference to FIG. 4. An explanation of all such circuitry, as more particularly illustrated in FIG. 7, and the functions collectively achieved thereby with micro-controller 550 are set forth more particularly below.

Pins 25–27 of micro-controller 550 are related to manually selectable switches S1–S3, respectively, which establish the width of a repsonse dead band in a digital count system. In general, micro-controller 550 is an eight bit processor, working with counts 0–255. The three bits of inputs on pins 25–27 establish eight counts 0–7, with 0 being representative of the smallest width dead band.

Generally in accordance with the present invention, a user is permitted to select the psition of such digital switches so as to designate a particular dead band width for use by the controller. Just as the analog embodiment of present FIGS. 1 and 2 has a comparator 140 which compares an actual feedback speed and a desired speed setting, and uses the error difference therebetween to control servo motor 44, the present digitally-based embodiment of this invention compares the feedback signal and the desired speed signal to obtain an error difference which falls in the range of counts 0–255. The selected dead band count of 0–7 establishes that portion of the error range 0–255 which would be ignored by micro-controller 550 in driving either solid state relay 552 or 554 to control motor 364 of present FIG. 3.

While use of a response deasd band with a control circuit is generally known, the present invention further provides an automatic dead band means feature in addition to the manually-selectable mean band means discussed above with reference to switches S1–S3. As discussed above, mechanically-adjustable variable speepd drives under load are generally known to have at least some small amount of variation (i.e. instability). With a digitally-based highly accurate control system, even such slight load variations could cause the controller to hunt about the desired speed, i.e. constantly reverse the actuating control means (e.g. motor 364) by jogging between up and down relays 552 and 554. It is one objective of the present invention to provide a manually selectable dead band width so that the ultimate user of the controller and variable speed drive may select his or her own desired dead band based on the conditions of their application. However, it is a further object of this invention to overcome the difficulties of hunting which would occur with a high precision controller operative with a tight dead band setting and a slightly unstable mechanically-driven variable speed load. Accordingly, the present invention as a further aspect thereof may include automatic dead band means for automatically electronically adjusting the dead band width (without physically changing the position of switches S1-S3) whenever the user has selected the most narrow (i.e. tightest) dead band width corresponding to the 0 position.

In the exemplary embodiment of the present invention, such automatic dead band means is conveniently achieved through use of the micro-controller 550, and is operative to automatically and incrementally increase the counts from 0 through 7 as needed to prevent excessive hunting by micro-controller 550. While different embodiments of such adaptive control may be utilized, a preferred embodiment of automatic dead band means for the present invention monitors the number of reverse actuations between up and down relays 552 and 554 in a given period of time, and increases the width of the response dead band whenever a given number of such reverse actuations is exceeded within a given period of time. For example, if the user initially sets the dead band position to zero count, the automatic dead band means of the present invention automatically increases such count from zero to one if there are more than three reverse actuations between the up and down solid state relays within a given period of time, such as 6.4 seconds. If a succeeding period of time produces still a determined excessive number of reverse actuations, the response dead band width is again incrementally increased from count one to two. Conversely, as the number of reverse actuations falls within an acceptable number for a given period of time, any incrementally increased number of counts for the response dead band width is likewise decremented one at a time (per given period of time) until the zero count width set by the user is again achieved. Such automatic dead band means greatly enhances the prevention of excessive hunting by micro-controller 550, particularly when used with a mechanically adjustable variable speed drive.

Pins 21–24 of microcontroller 550 are all adapted to accept analog inputs thereto. Internally, such inputs are then converted to digital values. Respectively pins 21–24 are related to the aforementioned user-defined load characteristic signal (LIM), a scale factor (SF) signal for scaling the output shown by display means 320, a feedback (FB) signal (such as received on line 368 of FIG. 3), and a speed setting signal, such as established with speed knob 350 of FIGS. 3. As shown by FIG. 5, the circuitry for generating each of such four signals is more specifically illustrated in presnet FIG. 7, as discussed below.

Referring to FIG. 7, limit pin 21 includes a settable potentiometer 600 for scaling the user-provided load characterization signal from input connector 602, previously described with reference to pin 9 of terminal board 428 of FIG. 4. It should be understood that for the sake of clarity the signal ground (pin 10 of terminal board 428) for such user-provided limit input signal is not specifically illustrated in FIG. 7, through understood by those of ordinary skill in the art. For the same reasons, similar other signal input grounds throughout such circuit are also omitted. Capacitor 604 and dividing resistors 606 and 608 further complete the input circuit for such user-prepared limit signal "LIM".

Functionally, micro-controller 550 responds to the arbitrarily defined and user-scaled input on pin 21 thereof to prevent excessive driving of the load powered by variable speed drive 362. In other words, once an arbitrary load threshold is exceeded (such threshold being established by judicious setting of potentiometer 600), the limit means defined by digital controller means of FIGS. 5–8 functions to drive control motor 364 so that the output of output drive shaft 360 once again conforms with the limit threshold. For example, the process load or variable in which a user is interested may be related to a torque value within the powered load or process, or the amount of load being applied to output shaft 360.

Whenever the limit threshold is exceeded, as initially established in part with limit knob 390 of FIG. 3 (corresponding to potentiometer 600 of FIG. 7), the digital controller means defined by micro-controller 550 and its peripheral circuitry operates to suspend normal driving of display means 320, and instead flashes a message or contorl code on such display means to let the user realize that control motor 364 is under the driving control of the limit means of the present invention. Such message function may be incorporated inot programming of micro-controller 550 as a type of diagnostic display multiplexer with different messsages for indicating different control modes, and the like. In this instance, a particular control code (for example CC1) can be indicated by display means 320 to show that the controller means is operating in the load limiting mode and is not commanding control motor 364 in accordance with the desired speed signal established with speed knob 350. Such messasge function means of the present invention and further exemplary control codes and conditions thereof are discussed further, below.

Pin 22 of micro-controller 550 also generally concerns interaction between such micro-controller and display means 320. Pin 22 is also adapted to directly reeive an analog signal. As illustrated in FIG. 7, SF stands for scale factor, and is related to trim pot 434 of FIG. 4. Such trim pot directly corresponds with potentiometer 610 of FIG. 7 indicated between ultrastable input 4.7 volts and dividing resistor 612, and ground, for providing an analog input on lead line 614 to pin 22 of micro-controller 550.

The purpose of the scale factor is to provide a multiplier by which information to be displayed by display means 320 is scaled or multiplied to establish given or desired engineering units to provide a more meaningful output by display means 320. All four analog inputs of pins 21–24 of micro-controller 550 are responsive to a range of voltages established by low and high reference voltages for same (pins 20 and 19 thereof, respectively). The voltage level provided on such analog input pins is thus ratiometrically compared with such reference voltages in a manner similar to an analog to digital conversion over a count of 0–255. Thus, in theory, the multiplying factor which can be established by potentiometer 610 is between 1 and 255. However, when only a four digit display is used for display means 320, a range of only about 1–50 is more than adequate to cover all practical applications. If a higher number of digits were used for display means 320, then a wider range of multiplying factors might be more practical, and would already be provided with the present embodiment.

FIG. 7 further illustrates that signal information on line 615 is fed to a feedback (i.e. FB) pin 23 of micro-controller 550. It should be understood that whatever signal information appears on such analog input pin is processed as a tachometer signal indicative of the output speed of output drive shaft 360 of variable speed drive 362, and as such is automatically displayed by display means 320 under the drive of micro-controller 550.

From FIG. 7, it may be further seen however that input line 616 connects with a dual-ganged switch 618 associated with the preset function of the present invention, discussed above in conjunction with momentary switch 330 of FIG. 3, with which 618 corresponds. The upper portion of double pole switch 618 causes input line 616 to be switched between two further lines 620 and 622. The condition with lines 616 and 620 inter-connected is regarded as a normal mode while connection of line 616 with line 622 occurs during a defined preset mode.

Considering the lower pole of preset switch 618 with respect to pin 17 of FIG. 5, it is understood that input pin 17 of micro-controller 550 is either connected with a defined high voltage (+5 volts DC) or a defined low voltage (ground). In the normal mode (i.e. lower pole of switch 618 connected to contact 626), input pin 17 of micro-controller 550 is set to such high input, while it is set to ground (i.e. the low input) during the preset mode. Hence, contact of the respective poles of switch 618 with upper contacts 624 and 626 maintain micro-controller 550 in a normal mode, while contact of such poles with respective lower contacts 628 and 630 cause operation in the defined preset mode.

During the normal mode, actual output speed information concerning output drive shaft 360 is fed via line 620, contact 624, the upper pole of preset switch 618, and line 616 into the feedback pin of micro-controller 550. Tachometer signal information is present on line 620 from a speed feedback means by virtue of connection of a signal from such means with input connection 632 (discussed above the reference to pin 5 of terminal board 428 of FIG. 4).

The present invention is adaptive to operate with a variety of different structures now existing in the field. For example, some of such structures concerning feedback means produce signals having a varying frequency related to rotational speed, while others produce a varying voltage related to such rotational speed. By changing the position of jumper pin 448 of FIG. 4 (corresponding to jumper pin 634 of FIG. 7), the present invention may adapted for use with either of such two basic types of feedback means.

If a feedback signal present on contact 632 is of a varying voltage type, then feedback jumper 634 is connected between the center pole and the DC pole thereof, so that the incoming varying voltage feedback signal may proceed directly along line 636, through a potentiometer defined as "standard" (STD), and eventually into pin 23 of micro-controller 550.

However, should the feedback signal at contact 632 be the varying frequency type, then such signal may be fed through a filter circuit 638 and into a frequency to voltage converter 640, whereupon the final voltage signal is again fed through the trim pot STD and eventually into FB analog input pin 23 of micro-controller 550. In such instance, jumper pin 634 is set between the center contact thereof and the FQ (for frequency) contact thereof. Frequency to voltage converter 640 may comprise a number of different elements, but in the presently preferred exemplary embodiment includes a micro-chip based device known to those in the art as an LM2917N. Such chip 642 includes other features as discussed more fully herein below.

The STD potentiometer 644 of FIG. 7 and the filter capacitor 646 thereof corresponds wiwth the trim pot 436 of FIG. 4. The purpose of such potentiometer (which is essentially in series between the feedback signal of contact 632 and the feedback input 23 of micro-controller 550 is to standardize such signal to be compatible with the micro-controller display range. In other words, the feedback signal is scaled so that the maximum rpm of the micro-controller (in the preferred embodiment set arbitrarily at 5100 rpm) corresponds to an input voltage of 4.7 volts, i.e. the high reference voltage for micro-controller 550 as discussed herein below with reference to pin 19 thereof.

With further regard to function of the preset means, switching of preset switch 618 (from contacts 624 and 626 to 628 and 630) causes the tachometer feedback signal on line 620 to be removed from feedback pin 23 of micro-controller 550, and replaced with signal information present on line 622. Whenever the jumper for reference set point A (SPA) 650 is set to internal (I), a desired speed setting from speed potentiometer 652 is forwarded through lline 654, jumper 650, and line 656 onto line 622 for input into feedback pin 23 of micro-controller 550.

Micro-controller 550 automatically causes display means 320 to display rotational speed information input on pin 23 thereof. Thus, during the preset mode, display means 320 is caused to display the desired speed setting data determined by speed potentiometer 652, instead of the actual feedback speed data received on pin 632.

Also as part of the preset mode function, because the lower portion of preset switch 618 causes input pin 17 of micro-controller 550 to changes states (as described above), the micro-controller recognizes such state changing as a sign of the preset mode to inhibit any driving of either solid state relay 552 or 554 during such mode. Hence, the preset mode temporarily suspends active control of motor 364, and permits a user to see on display means 320 an accurate indication of a newly desired speed being established with speed knob 350.

Upon completion of the preset mode and return to the normal operating mode (i e. switch 618 being returned to contacts 624 and 626), micro-controller 550 automatically drives solid state relays 552 and 554 as needed so as to obtain an output speed for output drive shaft 360 in accordance with the newly selected desired speed thereof established with speed potentiometer 652 (corresponding to speed knob 350 of FIG. 3).

In the analog-based embodiment of the present invention illustrated in present FIGS. 1 and 2, controller 74 included a manual knob 78 on the face thereof for establishing a desired rotational speed for output drive shaft 60. Micro-controller 550 of the present digitally-based embodiment of this invention likewise receives a desired speed signal input. In paritcular, an analog representation of such desired speed is received on pin 24 of micro-controller 550. As more specifically illustrated in FIG. 7, such desired speed signal is forwarded to pin 24 via line 660, pins 662 and 664 of RUN/IDLE switch 667 (when such switch 667 is set to its "run" position), line 656, the internal (I) side of jumper 650, and line 654 from speed potentiometer 652. Speed potentiometer 652 corresponds directly to setting of the speed knob 350 of present FIG. 3.

Trim pots 432 and 438 of FIG. 4, related to minimum and maximum speed adjustment settings, corresponds respectively with potentiometers 670 and 672 of FIG. 7. Such potentiometers are respectively coupled with reference input voltages of 4.7 volts and respective voltage divider resistances 674 and 676.

Thus, whenever a user desires to adjust the desired speed for output shaft 360, the preset mode of doing same (as described above) may be utilized, or speed potentiometer 652 may be manipulated for directly changing the speed inputs of micro-controller 550.

Run/idle switch 667, corresponding to toggle switch 340 of FIG. 3, enables the user to select the minimum speed operating point defined by potentiometer 670 without having to disturb the set point setting determined by speed potentiometer 652. In other words, as switch 667 is actuated to its idle position so that poles 662 and 678 thereof are in contact, line 680 directly in contact with minimum speed adjustment potentiometer 670 conducts the setting thereof to input pin 24 of micro-controller 550 (instead of the desired speed setting on speed potentiometer 652).

However, whenever switch 667 is set in its run position, a desired speed signal set by potentiometer 652 is compared with the speed feedback signal on contact 632 (inputs to pins 24 and 23, respectively) for establishing driving control signals selectively output to relays 552 and 554. In controlling such relays, micro-controller 550 functions (taking into account the dead band feature of the present invention discussed above) so as to output control pulses to correct for effects between the actual speed signal (on contact 632) and the desired speed signal (produced by potentiometer 652). To minimize any overshoot or hunting errors, the widths of the output control pulses to relays 552 and 554 are proportionately controlled with respect to the size of the error between the desired and actual speed signals.

Since a digital embodiment is presently considered, such errors take the form of a whole number count falling within the range of 0-255 (with zero being the lowest). Any error count up to the amount of a presently established dead band width results in no control signals whatsoever being output to either of the relays 552 or 554. An error count falling between the established dead band width and an arbitrarily defined count number (e.g. such as 4) may be defined as low error, which results in designation of a particular percentage (low) width control pulse, for example 25%. Medium control pulses may be arbitrarily defined, such as 50% duty width, and be output responsive to arbitrarily defined medium error, such as within a range of 4 to 8 counts of error. A defined class of large error signals may result in still larger pulse widths. For example, errors in excess of eight counts may be considered as high, and result in a 100% pulse width control signal being output to an appropriate one of the solid state relays 552 and 554.

Such overall pulse width scheme is referred to as a proportional control move since the degree of control is in proportion to the degree of error.

Still another feature of the present invention permits further alternative establishment of a speed input signal on pin 24. Specifically, X (i.e. external) poles 690 and 692 of set point jumpers A and B (650 and 694, SPA and SPB respectively) may permit micro-controller 550 to have its speed set point input controlled externally in a master/slave configuration. Input contact 696 (mentioned above with reference to pin 7 of terminal board 438 of FIG. 4) may receive speed set point commands from different external sources, such as other drive controllers, which essentiallly control processes or loads operating in parallel or in conjunction with the loads being driven by respective output shafts of different variable speed drives. In such instance, the input signal on external input contact 696 is input with respect to resistor 698 connected to ground along line 700 through maximum speed adjustment potentiometer 672, through line 702, and ultimately into line 660 which carries the externally-defined speed command into the speed pin 24 of micro-controller 550.

It is readily apparent from present FIG. 7 that placement of jumper set point B (SPB) 694 on the internal side (i.e. I) thereof establishes a reference of 4.7 volts, which is further variably reduced either through potentiometer 672 (SPA jumper 650 set to its X position), or a combination of potentiometer 672 and 652 (SPA jumper 650 set to its I position), or a combination of all three potentiometers 672, 652, and 670 (with run/idle switch 667 set in its idle position).

In addition to making provision for accepting external control inputs, the present invention also provides follower outputs for use in similar master/slave configurations, for powering up to eight slave units. In particular, follower output connection 710 of FIG. 7 corresponds to pin 3 of terminal board 428 of FIG. 4, as discussed above. Chip device 642 (as described above) also provides in addition to frequency to voltage converter device 640 thereof, a follower output amplifier 712 and follower transistor 714 for providing the folloer output at contact 710. A negative feedback loop for operational amplifier 712 and transistor 714 is established with resistors 716 and 718, and further with the follower output gain being established by gain (G) potentiometer 720, which corresponds with trim pot 440 of FIG. 4.

As further illustrated in FIG. 7, input line 722 of follower amplifier 712 may be connected to several different points through selected setting of follower output (FO) jumper 724, corresponding with jumper 450 of FIG. 4. In the illustrated position of jumper 724, the desired (i.e. commanded) speed signal (however established) existing at contact point 726 for feeding to speed pin 24 of micro-controller 550 is forwarded via line 728 into follower amplifier 712.

Alternatively, jumper 724 may be set to interconnect the center pin thereof with feedback pin 730 thereof so as to disconnect the commanded speed input side thereof to the follower output amplifier, and instead connect through line 732 as the input thereof whatever feedback information appears on line 620. Hence, even the follower output on contact 710 is selectable to follow either the commanded speed set point of the micro-controller 550 or the feedback signal of the master drive.

Furthermore, the follower gain is adjustable with use of gain pot 720, as discussed. Chip device 642 essentially utilizes the higher voltage of 7.5 volts as its reference. Such higher reference is preferred to establish a chip functioning range of at leat 0-5 volts. If only a 4.7 volt reference were used, it is known that approximately 1.5 volts or so is lost due to voltage drops induced with the frequency to voltage converter so that an insufficient voltage range would result between the low and the high reference thereof. The remaining inter-connections of device chip 642 are understood by those of ordinary skill in the art without further comment.

With respect to the reference voltages utilized by micro-controller 550 itself, an ultrastable high reference voltage $V_{RH}$ of 4.7 volts is supplied from the power supply of FIG. 8 to pin 19 of the micro-controler (see FIG. 5). However, the low reference voltage $V_{RL}$, which is input on pin 20 of micro-controller 550 of FIG. 5, is selectable between zero and one volts. The purpose of such selection is to permit adaptation of the input range of micro-controller 550 between two separate ranges of 0–4.7 volts or 1–4.7 volts. It is known in the industry that different devices sometimes operate on different signal voltage ranges. A selectable voltage range for micro-controller 550 permits maximum flexibility for use with different types of existing equipment in the field.

The last feature which is actually selected with respect to micro-controller 550 with a switch or the like relates to the switching function accomplished with switch S4 on pin 18 (defined as RPM). Such switch itself merely interconnects pin 18 with a respective digital high or lower. Micro-controller 550 responds to switch S4 for driving display menas 320 so as to display subject matter thereon in either a time mode (e.g. rpm's) or as inverse time mode.

With respect to driving of a display means 320 by micro-controller 550, and the diagnostic display multiplex or message function operation thereof described generally above, additional control codes and the like may be output on display means 320 responsive to various operating conditions of micro-controller 550. For example, micro-controller 550 may be programmed for automatically responding to loss of a feedback signal on contact 632 (actually lost at pin 23) to automatically drive variable speed drive 362 down to the minimum defined speed thereof, and alternately flash a message (for example "CCO" for "control code zero") to indicate that there has been a loss in feedback. In a practical sense, such minimum speed normally approximates 200-300 rpm. Without such feedback loss protection means, racing or other undesired control of variable speed drive 362 could result upon loss of such signal. Hence, the automatic feedback loss protection means established with such operation of micro-controller 550 protects both the ariable speed drive 362 and any real world load or process being driven or managed thereby.

Also, while specific details of programming for micro-controller 550 have not been addressed, those of ordinary skill in the arts concerning microprocessors and related devices are in general very familiar with programming of same once desired functions are established. The present disclosure has provided a full and enabling description of the functions of the present invention sufficient to permit one of ordinary skill in the art to make and practice such invention.

Furthermore, while a greater variety of different specific embodiments may be provided by those of ordinary skill in the art in order to practice the invention presently disclosed, the embodiment generally illustrated in present FIGS. 3-8 is preferred, particularly in that because it provides maximum flexibility in the field for use with a variety of different equipment. For example, the various board programmable jumpers discussed throughout the specification permit for example use of different types of tachometer feedback signals, and different sources of desired speed input signals.

Similarly, use of a micro-controller in the preferred embodiment of the digitally-based embodiment of this invention permits efficient and convenient handling of such functions, such as automatic input/output refresh, and incorporation of input low pass filters. Such a completed system provides an overall control system with a high degree of electrical noise immunity to provide reliable operation in industrial environments where it is likely the controller will be used to drive processes associated with mechanically-adjustable variable speed drives.

While generally rugged, the present device still maintains adaptability to user circumstances. For example, the limit information supplied by the user on contact 602 of FIG. 7 may include a variety or signal sources, such as the current being drawn by further loads powered by variable speed drive 362, or various torque or time-related processing signals from such commercial applications.

It will be understood, of course, that while the form of the invention herein shown and described constitutes preferred embodiments of the invention, it is not intended to illustrate all possible forms of the invention.

It will be further understood that the present disclosure is directed to those of ordinary skill in the art, and thus presumes a corresponding level of understanding by the reader concerning common terminology and symbols. For example, fixed voltage sources, such as connected to the wiper arms of potentiometers 223 and 118 (FIG. 2), and represented by a circle and intersecting line, are not discussed in detail. It will also be understood that the words used are words of description rather than of limitation and that various changes may be made without departing from the spirit and scope of the invention herein disclosed.

What is claimed is:

1. A variable speed drive, comprising:
an electric motor providing a substantially constant speed on an output shaft thereof;
a first pair of spaced disks carried on said output shaft of said electric motor, one of said disks being fixed to said output shaft and the other disk being axially adjustable on said shaft;
an output drive shaft, having its axis rotatably mounted and spaced a substantially fixed distance from said output shaft of said electric motor, said output drive shaft being adapted for powering a selected load;
a second pair of spaced disks carried on said output drive shaft, one of said disks being fixed to said output shaft and the other disk being axially adjustable on said output drive shaft;
a drive belt extending between said two pair of disks for drivingly coupling said output drive shaft with said electric motor;
control motor means for varying the spacing between said disks of each responsive pair of disks so as to correspondingly radially shift said drive belt between said disks and thereby controllably vary the output speed of said output drive shaft;
tachometer means for generating a signal indicating the actual RPM's of said output drive shaft;
speed setting means for providing a signal corresponding to a manual setting indicating a desired rotational output speed of said output drive shaft;
digital controller means, for generating a correction signal responsive to said tachometer means and said speed setting means, and for supplying said correction signal to said control motor means to control same to adjust said spacing of said disk pairs and said shift of said drive belt so as to adjust the output speed of said output drive shaft to said desired speed;
said digital controller means including,
relay means for selectively and alternately driving said control motor means in alternating rotational directions responsive to asid correction signal,
automatic dead band means for inhibiting driving of said control motor means when the relationship between said tachometer means signal and said speed setting means signal is within a predetermined dead band, said predetermined dead band being adaptively changed responsive to operation of said relay means so as to automatically prevent excessive hunting of said digital controller means,
display means for displaying rotational speed information determined by said digital controller means concerning said output drive shaft, and
preset means, selectively operative in one of a defined normal mode and a defined preset mode, operative in said normal mode for causing actual output drive shaft rotational speed information to be displayed by said display means, and operative in said preset mode for inhibting operation of said relay means while causing desired output drive shaft rotational speed information as determined by said speed setting means to be displayed by said display means, said controller means and relay means thereof thereafter, upon return to said normal operative mode, automatically driving said control motor means so as to establish said actual speed in accordance with said desired speed.

2. The variable speed drive as in claim 1, further comprising:

electrical means for indicating to said digital controller means maximum and minimum speed adjustments of said output drive shaft; and wherein said digital controller means further includes limit means, adapted to be responsive to a user-determined setting and a load signal from said control motor means, for automatically operating in a limiting mode to limit driving of said motor control means in accordance with said user-determined setting.

3. The variable speed drive as in claim 1, wherein:

said control motor means includes,
(i) a shaft;
(ii) a cam member carried on said shaft; and
(iii) a servo motor for rotating said cam so as to axially shift at least one of said disks of said first pair of disks for varying the spacing therebetween.

4. A variable speed drive as in claim 2, wherein said digital controller means further includes:

feedback loss protection means, responsive to said tachometer means signal, for automatically operating in a fail-safe mode to drive said control motor means to said minimum speed adjustment if said tachometer means signal falls below a predetermined threshold; and message function means for causing said display means to provide user-identifiable indications whenever said limit means is operative in its limiting mode, or whenever said feedback loss protection means is in its fail-safe mode.

5. A variable speed drive as in claim 1, wherein:

said digital controller means further includes a user-selectable input mode selector for adapting said controller means to accept input signals with differing ranges; and said digital controller further provides a predetermined output signal, the presence of which indicates that said controller means is operating properly; and further wherein said drive further includes auto reset means, responsive to said controller means predetermined output signal, for operating in a reset mode to restart operation of said controller means whenever said controller means is not operating properly.

6. A variable speed drive apparatus, comprising:

a mechanically-adjustable variable speed drive, having an input shaft and an output shaft drivingly coupled thereto, and an actuable member operatively associated with said shafts for mechanically adjusting the drive ratio therebetween;

power input means for rotatably driving said variable speed drive input shaft at a substantially constant speed;

actuator control means for ocntrollably adjusting the position of said variable speed drive actuable member so as to mechanically adjust the output speed of said output shaft thereof relative the substantially constant speed of said input shaft thereof;

tachometer feedback means for sensing the rotational speed of said variable speed drive output shaft and providing a tachometer signal corresponding to same;

speed setting means for providing a speed signal corresponding to a user-defined desired speed for said variable speed drive output shaft;

digital controller means, responsive to said tachometer signal and said speed signal, for driving said actuator control means so as to maintain said variable speed drive output shaft at said desired speed thereof; wherein said digital controller means further includes automatic dead band means for adapting to changes in the relationship between said tachometer and speed signals by adjusting automatically the width of a response dead band used by said controller means in driving said actuator control means, whereby excessive hunting of said controller means is adaptively prevented; and further wherein said controller means further includes manually-selectable dead band means for adjusting said width of said response dead band, subject to automatic adjustment thereof by said automatic dead band means; and said automatic dead band means functions to incrementally increase said width of said response dead band from the setting thereof established by said maually-selectable dead band, responsive to the occurrence of said actuator control means being driven in reverse actuations by asid controller means a given number of times within a predetermined period of time, with subsequent incremental decreases from such increased dead band widths as the number of such actuation reverses decreases below said given number in said predetermined period of time.

7. An apparatus as in claim 6, wherein said mechanically-adjustable variable speed drive includes:

a first pair of spaced disks carried on an output shaft of said power input means, with one of said disks being fixed on such output shaft and the other disk bieng axially adjustable thereon;

a second pair of spaced disks carried on said variable speed drive output shaft with one of such disks being fixed to such output shaft and the other being axially adjustable relative thereto; and a drive belt extending between said two pair of disks for drivingly coupling said variable speed drive input shaft and output shaft at variable ratios, with said drive belt being adapted for positioning by said variable speed drive actuable member.

8. An apparatus as in claim 6, further comprising display means, drivable by said digital controller means, for selectively displaying variable speed drive output shaft speed information and messages from said digital controller means.

9. An apparatus as in claim 8, wherein said digital controller means operates in a normal mode to drive said display means to display output shaft actual rotational speed information as derived from said tachometer signal, and wherein said digital controller means further includes:

preset means for operating said controller means in a preset mode to inhibit driving of said actuator control means and to cause said display means to display desired speed settings for said output shaft as determined by said speed setting means, with said controller means upon returning to said normal mode thereof subsequently driving said actuator control means to achieve the most recently displayed desired speed setting;

feedback loss protection means, responsive to loss of said tachometer signal by said controller means, for operating said controller means in a fail-safe mode to drive said actuator control means so as to lower said output shaft speed to a predetermined minimum speed; and message function means for causing said display means to display user-identifiable indications that said controller means is operating in said fail-safe more.

10. An apparatus as in claim 9, further comprising:

limit setting means for providing a threshold signal corresponding to a user-defined limit for a load characteristic of a device or process adapted to be driven by said variable speed drive output shaft; and wherein said digital controller means further includes limit means, responsive to said threshold signal and further adapted to be responsive to a load characteristic signal from such device or process being driven by said output shaft, for driving said actuator control means so as to limit the rotational speed of said output shaft whenever said threshold signal is exceeded by such load characteristic signal; and wherein said message function means of said controller means further operates to display a user-identifiable indication whenever said limit means is driving said actuator control means.

11. An apparatus as in claim 6, wherein said digital controller means further includes:

a selectable low reference voltage for adjusting said controller means to accept input signals from existing devices having different output signal ranges;

follower outputs and external inputs for providing and accepting, respectively, variable speed drive control signals with other like controller means configured in a master/slave arrangement with said digital controller means; and an operation characteristic output signal indicative of proper operation of said digital controller means; and said apparatus further includes automatic reset means, responsive to said operation characteristic output signal from said digital controller means, for automatically resetting said digital controller means upon improper operation thereof.

12. An apparatus as in claim 6, wherein said digital controller means outputs variable speed drive control signals for driving said actuator control means, the width of which control signals is automatically varied in proportion with the amount of difference between said tachometer signal and said speed signal.

13. An apparatus as in claim 8, wherein said digital controller means further includes user-actuatable run/idle means for selectively operating said controller means in a run mode where said controller means drives said actuator control means in accordance with said tachometer and speed signals, and an idle mode where said controlled means drives said actuator control means in accordance with said tachometer signal and a minimum speed signal, without disturbing said speed signal as established by said speed setting means.

14. A variable speed drive apparatus, comprising:

a mechanically-adjustable variable speed drive, having an input shaft and an output shaft drivingly coupled thereto, and an actuable member operatively associated with said shafts for mechanically adjusting the drive ratio therebetween;

power input means for rotatably driving said variable speed drive input shaft at a substantially constant speed;

actuator control means for controllably adjusting the position of said variable speed drive actuable member so as to mechanically adjust the output speed of said output shaft thereof relative the substantially constant speed of said input shaft thereof;

tachometer feedback means for sensing the rotational speed of said variable speed drive output shaft and providing a tachometer signal corresponding to same;

speed setting means for providing a speed signal corresponding to a user-defined desired speed for said variable speed drive output shaft;

digital controller means, responsive to said tachometer signal and said speed signal, for driving said actuator control means so as to maintain said variable speed drive output shaft at said desired speed thereof; and display means, driven by said digital controller means, for displaying rotational speed information concerning said variable speed drive output shaft; wherein said digital controller means in a normal mode drives said display means to display output shaft actual rotational speed information as derived from said tachometer signal, and said digital controller means further includes a user-actuable preset means for operating said controller means in a preset mode to inhibit driving of said actuator control means and to cause said display means to display desired speed settings for said output shaft as determined by said speed setting means, whereupon return to said normal mode from said preset mode said controller means drives said actuator control means so as to attain the most recently displayed desired speed setting; said apparatus further comprising limit setting means for providing a threshold signal corresponding to a user-defined limit for a selected load characteristic of a device or process adapted to be driven by said variable speed drive output shaft; and wherein said digital controller means further includes limit means, responsive to said threshold signal and a load characteristic signal form such device or process being driven by said output shaft corresponding to said selected load characteristic, for driving said actuator control means to limit the rotation speed of said output shaft whenever said threshold signal is exceeded by such load characteristic signal; .

adjustable dead band means for permitting a user to manually select the width of a response dead band in which said controller means will not respond to differences between said tachometer signal and said speed signal to drive said actuator control means;

automatic dead band means, operative whenever the smallest response dead band width is selected and responsive to predetermined characteristics of said driving of said actuator control means by said digital controller means, for automatically increasing and subsequently decreasing said selected response dead band width so as to prevent excessive hunting of said controller means;

feedback loss protection means, responsive to loss of said tachometer signal by said controller means, for operating said controller means in a fail-safe mode to drive said actuator control means so as to establish a predetermined minimum speed for said variable speed output shaft; and message function means for driving said display means to indicate respective user-indentifiable indications whenever said controller means is operating in said fail-safe mode thereof, and whenever said limit means is driving said actuator control means.

15. An apparatus as in claim 14, wherein said digital controller means provides a variable pulse width drive signal for driving said actuator control means, with the width thereof being proportionately controlled responsive to the proportional amount of error between said tachometer signal and said speed signal; and wherein said digital controller means further outputs a signal indicative of proper operation by said controller means; and wherein said apparatus further includes automatic reset means, responsive to such proper operation output signal from said controller means, for automatically resetting said controller means during improper operation thereof.

16. An apparatus as in claim 14, wherein said digital controller means further includes:

a user-selectable multiplying scale factor by which the output of said display means may be scaled for correspondence to selected engineering units;

a user-selectable display mode for selecting display of such units in a time mode or in an inverse time mode; and follower outputs and external inputs for operation with a plurality of other like controller means in a master/slave configuration.

17. A variable speed drive apparatus, comprising:

a mechanically-adjustable variable speed drive, having an input shaft and an output shaft drivingly coupled thereto, and an actuable member operatively associated with said shafts for mechanically adjusting the drive ratio therebetween;

power input means for rotatably driving said variable speed drive input shaft at a substantially constant speed;

actuator control means for controllably adjusting the position of said variable speed drive actuable member so as to mechanically adjust the output speed of said output shaft thereof relative the substantially constant speed of said input shaft thereof;

tachometer feedback means for sensing the rotational speed of said variable speed drive output shaft and providing a tachometer signal corresponding to same;

speed setting means for providing a speed signal corresponding to a user-defined desired speed for said variable speed drive output shaft;

digital controller means, responsive to said tachometer signal and said speed signal, for driving relay means for selectively and alternately determining the rotational direction operation of said actuator control means so as to maintain said variable speed drive output shaft at said desired speed thereof;

display means, driven by said controller means, for displaying output shaft speed information and messages from said controller means; and limit setting means for providing a threshold signal corresponding to a user-defined limit for a selected load characteristic of a device or process adapted to be driven by said variable speed device output shaft; and wherein said digital controller apparatus further includes limit means, responsive to said threshold signal and further adapted to be responsive to a load characteristic signal from such device or process being driven by said output shaft, for driving said actuator control means to limit the rotational speed of said output shaft whenever said threshold signal is exceeded by such load characteristic signal, automatic dead band means for automatically adjusting to differences between said tachometer and speed signals by making adjustment to the width of a response dead band used by said controller means in driving said actuator control means, so as to adaptively prevent excessive hunting of said controller means said adjustment being responsive to operation of said relay means, feedback loss protection means, responsive to loss of said tachometer signal by said controller means, for operating said controller means in a fail-safe mode to drive said actuator control means to establish a predetermined minimum speed for said output shaft, and preset means for operating said controller means in a preset mode to prevent driving of said actuator control means and displaying of actual output shaft speed information while causing display of newly set desired speed information designated with said speed setting means, whereupon exit of said preset mode said controller means drives said actuator control means in accordance with such newly set desired speed.

18. An apparatus as in claim 17, wherein;

said digital controller means operates to proportionally control driving of said actuator control means responsive to a difference ratio between said tachometer signal and said speed signal;

said digital controller means outputs a square wave signal indicative of proper operation of said controller means;

said digital controller means further includes message function means for driving said display means to indicate whenever either said limit means is driving said actuator control means; or said controller means is operating in said fail-safe mode thereof; and wherein said apparatus further includes automatic reset means, responsive to said square wave output signal of said controller means, for automatically resetting said controller means upon loss of said square wave signal for a given period of time.

19. An apparatus as in claim 17, wherein said controller means automatically refreshes outputs thereof driving said display means, and said controller means further includes:

means for selectably accepting either a frequency-based or dc-based tachometer signal from differing types of tachometer feedback means; and maximum and minimum speed settings for establishing a permissable range of speed settings for said speed signal by said speed setting means; and further wherein said power input means comprises reversible servo motor means; and said relay means includes respective up and down relay means controlled by said digital controller means for driving said servo motor means respectively up and down to effect desired changes in the output speed of said variable speed drive output shaft; and respective up and down control indicators for indicating actuation of said up and down relays by said digital controller means.

20. A controller apparatus for controlling a variable speed drive apparatus, including a mechanically-adjustable variable speed drive, having an input shaft and an output shaft drivingly coupled thereto, and an actuable member operatively associated with such shafts for mechanically adjusting the drive ratio therebetween; power input means for rotatably driving the variable speed drive input shaft at a substantially constant speed; actuator control means for controllably adjusting the position of the variable speed drive actuable member so as to mechanically adjust the output speed of the output shaft thereof relative the substantially constant speed of the input shaft thereof; tachometer feedback means for sensing the actual rotational speed of the variable speed drive output shaft and providing a tachometer speed signal corresponding to same; and display means, adapted to be driven for displaying rotational speed information concerning the variable speed drive output shaft, said controller apparatus comprising:

command speed setting means for providing a commanded speed signal corresponding to a user-determined desired speed for the variable speed drive output shaft;

digital controller means, selectively operative in one of a normal mode and a preset mode, and adapted to be responsive to the tachometer speed signal and said commanded speed signal, for producing in said normal mode thereof drive command signals based on differences between such tachometer speed signal and said commanded speed signal, said drive command signals adapted for driving the actuator control mens so as to adjust the output speed of the variable speed drive output shaft into conformance with said desired speed thereof;

relay means responsive to said digital controller means for selectively and alternately determining rotational direction operation of said actuator control means so as to adjust said output shaft output speed as desired;

automatic dead band means for inhibiting driving of said actuator control means when the relationship between said tachometer speed signal and said commanded speed signal is within a predetermined dead band, said predetermined dead band being adaptively changed responsive to operation of said relay means so as to automatically prevent excessive hunting of said digital controller means; and preset means for selectively placing said digital controller means in said preset mode thereof, during which said controller means is inhibited from producing said drive command signals, but instead is adapted for driving said display means to display desired speed information as determined by a user with said command speed setting means, whereupon return to said normal mode said controller means resumes producing said drive command signals responsive to said desired speed, whereby said preset mode of operation permits a user to accurately and rapidly preset a desired output shaft speed before actually commanding the variable speed drive in accordance with such desired speed.

* * * * *